United States Patent
Deak, Sr.

(10) Patent No.: US 11,368,079 B2
(45) Date of Patent: Jun. 21, 2022

(54) OFFSET TRIGGERED CANTILEVER ACTUATED GENERATOR

(71) Applicant: David Deak, Sr., Suffern, NY (US)

(72) Inventor: David Deak, Sr., Suffern, NY (US)

( * ) Notice: Subject to any disclaimer, the term of this patent is extended or adjusted under 35 U.S.C. 154(b) by 163 days.

(21) Appl. No.: 16/675,401

(22) Filed: Nov. 6, 2019

(65) Prior Publication Data

US 2021/0135543 A1    May 6, 2021

(51) Int. Cl.
| | |
|---|---|
| *H02K 35/02* | (2006.01) |
| *H02K 7/18* | (2006.01) |
| *H02K 1/34* | (2006.01) |
| *H01F 7/02* | (2006.01) |
| *F03G 5/06* | (2006.01) |

(52) U.S. Cl.
CPC ........... *H02K 35/02* (2013.01); *H01F 7/0273* (2013.01); *H02K 1/34* (2013.01); *H02K 7/1853* (2013.01); *F03G 5/06* (2013.01)

(58) Field of Classification Search
CPC ......... H01F 7/0273; F03G 5/06; H02K 35/02; H02K 35/00; H02K 33/16; H02K 1/34; H02K 7/1853; H02K 7/1807

USPC ....................................................... 310/75 B
See application file for complete search history.

(56) References Cited

U.S. PATENT DOCUMENTS

| | | | |
|---|---|---|---|
| 2011/0273052 A1* | 11/2011 | Long .................... | B62J 6/06 310/208 |
| 2015/0357893 A1* | 12/2015 | Deak, Sr. ............ | H02K 35/02 310/38 |
| 2017/0346377 A1* | 11/2017 | Deak, Sr. ............ | H02K 35/02 |
| 2018/0145561 A1* | 5/2018 | Deak, Sr. ............ | H02K 99/10 |

\* cited by examiner

*Primary Examiner* — Michael Andrews

(57) ABSTRACT

A plural magnet arrangement of a matrix of rows and columns having an altered magnet field alignment of a plurality of the magnets in a matrix comprising rows and columns of magnets in such a manner that there are at times a co-existing combination of changing attractive and repelling magnetic field regions all throughout the coil winding volume, reducing the counter electromotive force (voltage) during electrically connecting a load to the coil winding terminals and extends the time duration of the output voltage waveform and this is accomplished wherein the rotational torque required to rotate the centre magnet through the coil of which it is centred within is reduced.

10 Claims, 14 Drawing Sheets

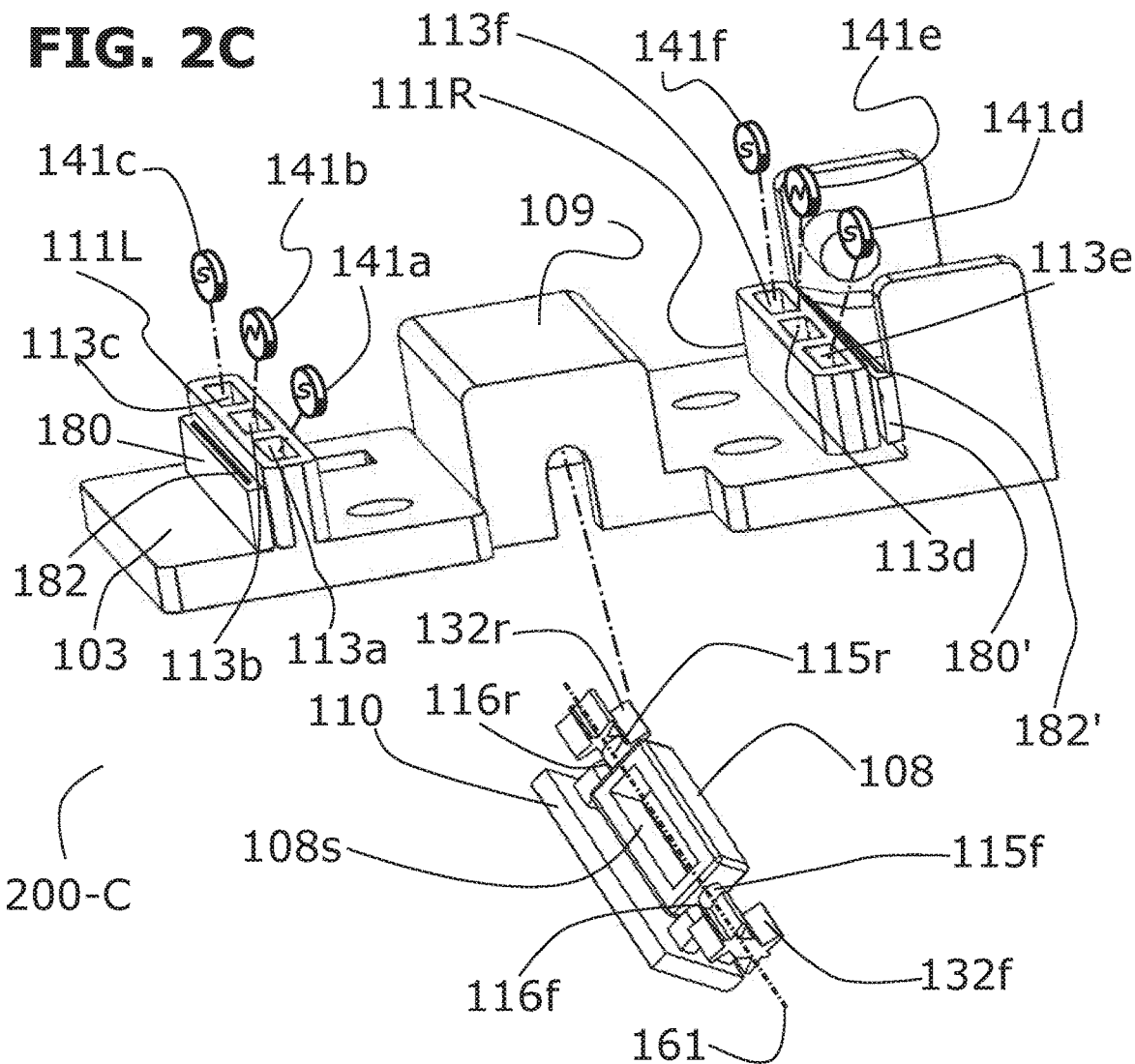

OFFSET TRIGGERED CANTILEVER ACTUATED GENERATOR

FIELD OF THE INVENTION

The present invention relates to energy harvesting electrical generators, in particular, single-motion or impulse actuated electrical generators with a damped sinusoidal output that are superior in instantaneous triggered resultant output compared to instantaneous triggered snap-action magnetic circuit types that have a short single electrical pulse output of a typical effective time duration of 2 milliseconds.

BACKGROUND

Energy harvesting devices cover a wide range of low to high power generation for many applications, especially generating electrical energy from mechanical motion produced by intentional operator or environmental incidental action and have size versus efficiency choices. For those low power applications many are significantly limited; and in general, offer inadequate wide range product utilization. Further efforts by some prior art related to continuous or short burst types have not shown significant improvements and do not show any greater problem or application understanding likely to provide any significant improvements thereof.

SUMMARY OF THE INVENTION

The present invention introduces and teaches a novel plurality magnet arrangement having distinct advantages and novelty over prior art whereby the present invention teaches a plurality magnet arrangement of a matrix of rows and columns has a novel method means of reducing the counter electromotive force (voltage) during electrically connecting a load to the coil winding terminals and this has novelty in extending the time duration of the damped sinusoidal output voltage waveform and this is accomplished by altering the magnet field alignment on the plurality of the magnet matrix comprise of rows and columns of plurality magnets in such a manner that there are at times a co-existing combination of changing attractive and repelling magnetic field region all throughout the coil winding volume.

The present invention also provides and teaches that a variable speed range of motion triggering, can be supplied by an external push force on a forked-cantilever that is movable and rotating on its offset inline axles that are on the opposite end of the fork arrangement, where the two fork end tabs come in momentary contact with a rotatable centre magnet disposed within a coil; and any trigger action causes an induced electromotive force (voltage) established at the coil terminals by a relativistic electrodynamic movement of electrical charge (electrons) within the coil winding in a continuous or pulsed periodic rotational energy harvesting generator. Whether the forked cantilever movement progression is slow action or fast action, once the forked cantilever moves the centre movable magnet (responsible for power generation) past the trigger release point of an dual set of angled plurality tooth arrangement situated on opposite sides of the centre movable magnet enclosure adjacent to so its common inline axles, the individual response of the power generating centre movable magnet (in its enclosure) disposed within the centre of the coil in conjunction with the first and second set of a plurality of fixed position focusing magnets situated at opposite ends of the coil, creates "geometrically distorted" and "changing magnetic field tensors" surrounding and passing through the coil winding; a varying power envelope is produced. The overall "relativistic moving charge effect" of inducing a voltage at the generator coil terminals is further enhanced by utilizing the two plurality sets of fixed directive (counter emf reducing) magnets, fixed on opposite ends of the coil, to concentrate the magnetic field throughout the generator coil winding; and with every movement of the cantilever trigger, in momentary and periodic mechanical connexion to the centred situated rotatable magnet, a voltage is produced at the coil terminals due to the relativistic movement of charge by magnetic field changes. With this arrangement a damped sinusoidal alternating voltage, with typical effective AC wave duration time under a "no-load" condition of several hundreds of milliseconds, is established at the coil terminals; and with the novelty of the present embodiment connecting a load to the coil will produce a substantially less decrease in the effective AC wave duration time. The novel structure utilizes modified effects of Ampere's Law, Lenz's Law, and the Lorentz Force in producing substantially less decrease in AC wave duration time.

The EMF (Electromotive Force, (defined below) generated by special relativistic charge movement and conforming to Faraday's law of induction (the flow of charge (current)) through a coil around an electrical complete circuit due to relative movement or change of a coil's magnetic field) is the phenomenon underlying electrical generators; however, most texts covering the Faraday Principle illustrates a moving coil through a stationary magnetic field source (a magnet), with the present invention the converse holds true where an independent magnet can be moved and rotated within the centre of an electric coil and whereby the coil has fixed on its opposite sides, two plurality sets non-movable fixed magnets. When a permanent magnet is moved relative to a conductor, or the converse condition, an electromotive force (voltage) is created at the coil end terminals. If the coil wire terminals are connected to an electrical load, current will flow in the completed circuit, and thus electrical energy is generated, converting the mechanical energy of motion to electrical energy, thus 'harvesting' mechanical energy as electrical energy for some application usage.

Special Relativity and Magnets

Now let us consider magnetism due to electrons. Apart from charge and mass, electrons also have an intrinsic magnetic moment that can be explained only through relativistic quantum mechanics. Thus, magnetism of a bar magnet is also a relativistic effect. Please note that magnetism in a bar magnet is because of the electron's spin, orbital motion and magneto-crystalline anisotropy.

Materials with high magnetic anisotropy usually have high coercivity, that is, they are hard to demagnetize. These are called "hard" ferromagnetic materials and are used to make permanent magnets. For example, the high anisotropy of rare-earth metals is mainly responsible for the strength of rare-earth magnets. During manufacture of magnets, a powerful magnetic field aligns the microcrystalline grains of the metal such that their "easy" axes of magnetization all point in the same direction, freezing a strong magnetic field into the material.

The strongest permanent magnets available today rare earth magnets, such as but not limited to, Neodymium (Nd,Pr)FeB and Samarium-Colbalt SmCo varieties having magnetic properties due to the interaction of the electron's spin and orbital motion with the potential created by the material lattice. Permanent magnets are not simply produced from having excess, non-cancelled electronic spins or some such. The requirement needed crystalline or shape features.

In reality, electricity and magnetism are equally fundamental parts of physics. Special relativity unites electricity and magnetism into electromagnetism, in exactly the same way that it unites space and time into spacetime. Time does not cause space, space does not cause time, and SR (Special Relativity) causes neither space nor time. SR (Special Relativity) merely reveals the relatedness of space and time. Similarly, electricity does not cause magnetism, magnetism does not cause electricity, and SR (Special Relativity) causes neither electricity nor magnetism. SR (Special Relativity) merely reveals the relatedness of electricity and magnetism.

Electromotive Force (EMF)

All voltage sources create a potential difference and can supply current if connected to a resistance. On a small scale, the potential difference creates an electric field that exerts force on charges, causing current. We call this potential difference the electromotive force (abbreviated emf). Emf is not a force at all; it is a special type of potential difference of a source when no current is flowing. Units of emf are volts.

Electromotive force is directly related to the source of potential difference, e.g. such as the particular combination of the number of turns and the thickness of the wire in a coil winding in a generator. However, emf differs from the voltage output of the device when current flows. The voltage across the terminals of a coil winding, for example, is less than the emf when the coil winding supplies current, and it declines further as the coil winding is electrically loaded down. However, if the device's output voltage can be measured without drawing current, then output voltage will equal emf.

Terminal Voltage

The voltage output of a device is measured across its terminals and is called its terminal voltage V. Terminal voltage is given by the equation:

$$V = emf - Ir. \quad (Eq. 1)$$

where r is the internal resistance and I is the current flowing at the time of the measurement.

I is positive if current flows away from the positive terminal. The larger the current, the smaller the terminal voltage. Likewise, it is true that the larger the internal resistance, the smaller the terminal voltage.

The preferred embodiment of the present invention has a plurality of rows and columns of magnets up as a matrix, and for exemplary embodiments of this present invention, there are rare earth magnets disk magnets arranged in a three column by two row array (matrix), where each column member magnet is separated proximal from each other and each row of three member magnets is separated distal from each other; for this present invention, including the novel feature having in each row, the magnetic pole alignment of a member magnet opposite to an adjacent member magnet. Other embodiments may include a larger number of magnets in each row, and may have all adjacent row magnets pole alignment oppositely disposed. The arrangement is such that their respective "up & down" magnetic pole circuitous alignment exists so that there is a first set of a $1^{st}$ member with S I. N (poled S facing up), a $2^{nd}$ member with N↑S (poled N facing up), and a $3^{rd}$ member with S↓N (poled S facing up) and they are all separated on one side proximal of a coil bobbin with its wire winding and on a side opposite the coil bobbin with its wire winding is a disposed second set of a $1^{st}$ member with S↓N (poled s facing up), a $2^{nd}$ member with N↑S (poled N facing up), and a $3^{rd}$ member with S↓N (poled S facing up); and disposed centred within the coil bobbin, is a rotatable about its axis, magnet. From this row and column arrangement is established a "complex-pole produced" three dimensional magnetic flux field encompassing the coil and its winding that is disposed in between the two rows of magnets and the rotatable centre magnet disposed within the coil bobbin (with symmetrically centred hollow core). Ergo, by analysis with the first row members there exists; [1] an attractive static magnetic field between proximal retained $1^{st}$ row member and proximal retained $2^{nd}$ row member, and [2] an attractive magnetic field between proximal retained $2^{nd}$ row member and proximal retained $3^{rd}$ row member; and with the second row members there exists; [3] an attractive static magnetic field between proximal retained $1^{st}$ row member and proximal retained $2^{nd}$ row member, and [4] an attractive magnetic field between proximal retained $2^{nd}$ row member and proximal retained $3^{rd}$ row member. [5] There exists a static attractive magnetic field between the $1^{st}$ magnet of the first row and the $1^{st}$ magnet of the second row distal. [6] There exists a static attractive magnetic field between the $3^{rd}$ magnet of the first row and the $3^{rd}$ magnet of the second row distal. [7] There is disposed a first changing differential function magnetic field region between the 2nd magnet member (centre position) of the first row and a first width side of the rotatable centre magnet disposed and free to rotate about its axis of rotation and [8] there is disposed a second changing differential function magnetic field region between the $2^{nd}$ magnet member (centre position) of the second row and a second opposite width side of the rotatable centre magnet disposed and free to rotate about its axis of rotation. Their combined respective magnetic field polarity is arranged in a completed attractive magnetic force circuit, such that in a rest state with no triggering action, the bi-directionally axially rotatable magnet disposed within the centre of the coil winding are in a magnetic equilibrium position (minimum mechanical energy state).

Repulsive Effects and Levitation

Electrodynamic Suspension:

In a varying magnetic field the induced currents exhibit diamagnetic-like repulsion effects. A conductive object will experience a repulsion force. This can lift objects against gravity, though with continual power input to replace the energy dissipated by the eddy currents. An example application is separation of aluminum cans from other metals in an eddy current separator. Ferrous metals cling to the magnet, and aluminum (and other nonferrous conductors) are forced away from the magnet; this A cross section through a linear motor placed above a thick aluminium slab. As the linear induction motor's field pattern sweeps to the left, eddy currents are left behind in the metal and this causes the field lines to lean. can separate a waste stream into ferrous and non-ferrous scrap metal. With a very strong handheld magnet, such as those made from rare earth magnets, one can easily observe a very similar effect by rapidly sweeping the magnet over a coin with only a small separation. Depending on the strength of the magnet, identity of the coin, and separation between the magnet and coin, one may induce the coin to be pushed slightly ahead of the magnet—even if the coin contains no magnetic elements, such as the US penny. Another example involves dropping a strong magnet down a tube of copper—the magnet falls at a dramatically slow pace. In a perfect conductor with no resistance (e.g. a superconductor), surface eddy currents exactly cancel the field inside the conductor, so no magnetic field penetrates the conductor. Since no energy is lost in resistance, eddy currents created when a magnet is brought near the conductor persist even after the magnet is stationary, and can exactly balance the force of gravity, allowing magnetic levitation. Superconductors also exhibit a separate inherently quantum mechanical phenomenon called the Meissner effect in which any magnetic field lines present in the material when it becomes superconducting are expelled, thus the magnetic field in a superconductor is always zero. Using electromagnets with electronic switching comparable to electronic speed control it is possible to generate electromagnetic fields moving in an arbitrary direction. In some geometries the overall force of eddy currents can be attractive, for example, where the flux lines are past 90 degrees to a surface, the induced currents in a nearby conductor cause a force that pushes a rotatable magnet towards a coil.

Ergo, the "Magnet Array," with its novel arrangement of a plurality of rows and columns of magnets, disposed and retained about a coil winding with a centred rotatable magnet, provides a method means for changing phase related angular and perpendicular magnetic fields that at rotational times act as resultant repulsive and at other times acting as resultant attractive and whereby the resultant fields are surrounding a coil winding with a disposed rotatable centre magnet leads to optimizing the overall performance and output power of the present invention.

The Effects of Wire Gauge

The effect of coil wire gauge in electromagnetic energy harvesting generators, and all other types as well, is determined by several mathematical factors. Consider Ohm's Law for power;

$P=V^2/R_l$ (induced voltage squared divided by the load resistance) and now relating to Faraday's Law; (eq. 2)

$P=(Nd(B\cdot A)/dt)/R_l \propto N^2/R_l$ (eq. 3)

Definitions are:

N=No. of turns, $R_l$=load resistance, B=vectoral strength of the magnetic field, A=coil cross section.

Further consider that the maximum transfer of power is when the coil resistance equals the load resistance. The smaller the coil of wire radius (r), the more turns N can be wound over a length and depth I and p is the specific resistance of the wire gauge.

$\therefore N \propto 1/r$ Then $R_c=R_{coil}=pI \propto (1/r^2)(\pi dN) \propto (1/r^3)$ (eq. 4)

This means that the harvested power should increase proportionally with the radius of the wire.

Power$\propto N^2/R_c \propto (1/r)^2/(1/r)^3 \propto r$ (eq. 5)

"However," the generated voltage decreases with the radius of the wire is;

$V_{coil}=Nd(B\cdot A)/dt \propto 1/r$ This is a crucial mathematical balancing act. (eq. 6)

The novelty summarized of this invention is that it is an energy harvesting generator that has one coil with a rotating magnet in the coil centre and at opposite sides of the coil are situated, by a support mechanism, two plurality sets of magnets, a first set on the left side of the coil and a second set on the right side of the coil fixed within this support mechanism, and each of the fixed single magnet but can be a plurality magnets sets have magnetic poles that are poled axially, and each has one attractive pole that faces the centre rotating magnetic field directive magnet in an attractive magnetic pole situation. Further, when the centre rotating magnet is triggered by an external force on the forked cantilever trigger, the centre rotating magnet can bi-directionally rotate in either a clockwise or anti-clockwise direction along the axis of rotation. Upon a push downward of the forked cantilever mechanism the centre magnet rotates in a clockwise direction and when the cantilever springs upward the rotation is anti-clockwise; and this dual action from one push, causes two separate induced AC ring down (damped) voltage periods in the common coil until axial friction causes the bi-directionally rotatable magnet to stop bi-directionally rotating.

The present invention's exemplary embodiments include utilizing rare-earth or high field strength plurality magnet sets such as rare earth magnets. There also exists a novel category of rare earth magnets that are identified as 'poly-magnets'. Poly-magnets start as regular rare earth magnets, such as but not limited to, Neodymium magnets. However, poly-magnets are entirely different from conventional magnets, which have one north and one south pole. Poly-magnets contain patterns of North and South poles, such as alternating north and south pole 'lines', on a single piece of magnetic material. The fields coming off of these patterns of north and south poles in turn define the feel and function of the poly-magnet. The field on the poly-magnet is tightly focused because the fields do not have to go as far to connect from north to south. The same amount of energy is present in both magnets, but the poly-magnet e.g. a flat flexible kitchen magnet, where one side is strongly magnetized, and the other side is weakly magnetized, has much more energy focused in front of the magnet where it can do work. Empirical research stemming from the development of the present invention indicate that the embodiments described herein have less counter emf to contend with when the generator of the present invention is connected to an electrical load.

BRIEF DESCRIPTION OF THE DRAWINGS

FIG. 2C is an exploded component view comprising the two separate sets of focus directive magnets of the present invention of FIG. 1.

FIG. 2D is a exploded perspective view including the centre magnet rotatable enclosure and the centre magnet of the embodiment of the present invention of FIG. 1.

FIG. 9) using a uniform horizontal inline column arrangement of a plurality of magnets, all poled in the same direction in a horizontal plane and a plurality of those column arrangements in a plurality of rows; and in a special case of a three by two column-row instance there is a centred single rotatable magnet along its horizontal axis; where the rotatable magnet is poled in a moment of time in a direction opposite to that of FIG. 9 through a complete possible rotation.

DETAILED DESCRIPTION OF THE DRAWINGS

Figure 1:
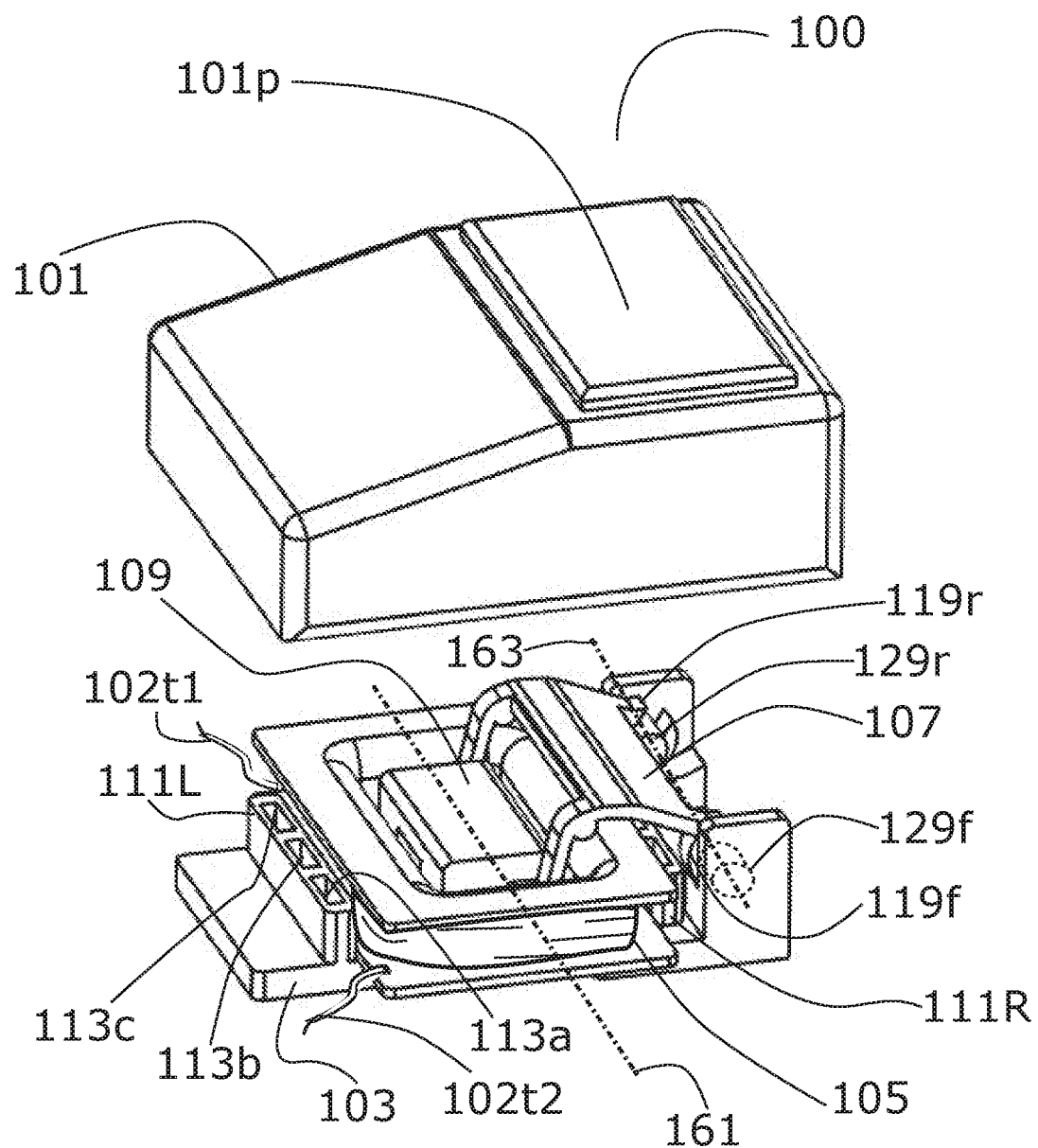
FIG. 1 is a perspective view of one embodiment of the present invention showing the offset triggered cantilever actuated generator with its enclosure removed for generator display.

FIG. 1 shows the preferred embodiment 100 of the present invention that has an enclosure comprised of the enclosure body 101 and a movable push-button disposed element 101p that is removed from enclosing to expose some of the major components of this embodiment. This exposure includes a base substrate 103, which supports a wound coil bobbin 105, a forked cantilever 107 comprised of bifurcated ends 117f & 117r (shown in FIG. 2), and a set of snap-on supports 119f & 119r (shown in FIG. 2) including a first snap-on front side support 119f and a second snap-on rear side support 119r, where they both snap-on for easy connexion to the base substrate's 103 first rear support cylinder protrusion 129r and the second front support cylinder protrusion 129f. The push-button 101p disposed section of the device enclosure 101, when it covers the remaining components of this embodiment, come in mechanical contact with the bifurcated plunger 107 and the push-button 101p has the action of angular movement (downward and upward) to cause by mechanical induction, the bifurcated plunger 107 to trigger the operational action of clockwise rotating about the bifurcated plunger's 107 axis 163 downward, the centre magnet enclosure 108 and its enclosed centre magnet 112 (shown in FIG. 2) and thereafter freely releasing the centre magnet enclosure 108 and its magnet 112 to rotate about its axis 161 backwards in anti-clockwise rotation. The base substrate 103 has two sets of blind rectangular inline holes 113a,b,c and 113d,e,f (shown in this figure and in FIG. 2 complete) disposed within the structures 111L & 111R on opposite sides of the coil bobbin 105 with winding 104 (shown in FIG. 2A) that in addition act as a support for the coil bobbin 105. The base substrate also has an enclosure 109 where the centre rotational magnet 112 and its enclosure 108 (shown in FIG. 2 and FIG. 2A) are seated and free to rotate and is held in place by magnet support base 110 and its two protrusions 130f & 130r (note: front protrusion 130f is shown in FIG. 2A); the front protrusion 130f and the rear protrusion 130r support the axles of the magnet 112 and its enclosure 108 that allows for rotation with minimum friction since the entire substrate 103 would be made of Nylon with 30% glass and the enclosure segment 109 would be made of Delrin or some equivalent low coefficient of friction material.

Figure 5:
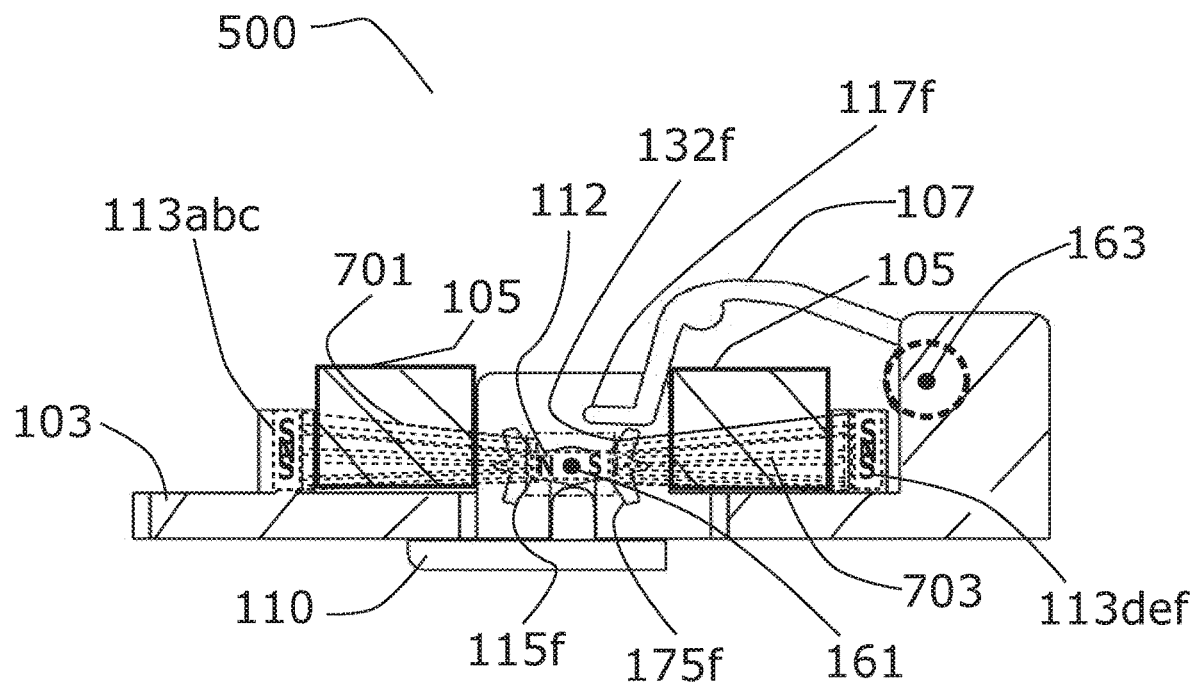
FIG. 5 is an illustration showing the equilibrium state of the comprised attractive interactive magnetic fields of the embodiment of the present invention of FIG. 1, with the central movable magnet that is diametrically poled and the two sets of inline lateral directive (counter emf reducing) magnets that are axially poled.

FIG. 2 is an exploded view 200 showing the present invention's preferred embodiment identifying all of the components that make up the generator without showing the cover that is shown in FIG. 1. With this embodiment, the coil bobbin 105 is designed with a built-in (moulded-in) attachment 105a with a disposed centre through hole 106; and two opposite break-off tabs 106a & 106b; where there is a first break-off tab 106a, and a second break-off tab 106b on the opposite end of the attachment 106, whose purpose (in the production coil winding phase) is to allow the coil bobbin 105 to be mounted on a coil winding machine and then post-winding, the attachment 105a is easily snapped off in production. With this embodiment there are two sets of a plurality of blind slots 113a, b, c & 113d, e, f; for the insertion of a plurality of magnets 141a, b, c & 141d, e, f (shown in FIG. 2C) and they are disposed and permanently secured in a fixed position within the slots, with their respective "up & down" magnetic pole circuitous alignment so that there is a first set of a $1^{st}$ member with S↓N, a $2^{nd}$ member with N↑S, and a $3^{rd}$ member with S↓N and they are all separated on one side proximal of the coil bobbin 105 with its wire winding 104 and on a side opposite the coil bobbin 105 with its wire winding 104 is a disposed second set of a $1^{st}$ member with S↓N, a $2^{nd}$ member with N↑S, and a $3^{rd}$ member with S↓N; and disposed centred within the coil bobbin 105, is the rotatable magnet 112. These plurality of small disk type magnet sets are axially poled and act as counter emf reducing magnets directing the combined magnet fields (shown in FIGS. 7, 8, & 9) through the coil winding 104 wound around the coil bobbin 105; and the first intermediate magnetic field 701 (shown in FIG. 5 is in its equilibrium non-trigger state) between plurality magnets 113a,b, c and the centre rotating magnet 112 passes through the first half of coil 105 and its winding 104; and the second intermediate magnetic field 703 (shown in FIG. 5 is in its equilibrium non-trigger state) plurality magnets 113d, e, f and the centre rotating magnet 112 passes through the second half of the coil 105 and its winding 104. The centre drive magnet 112 is disposed (fixed) within its axially rotatable enclosure 108 and is free to rotate about its dual inline axles 115F & 115r (about the axles 115F & 115r axis 161) as the complete drive magnet assembly 112 & 108; and this assembly 112 & 108 is disposed within the magnet drive housing 109 that is a section of the base substrate 103. The magnet drive assembly 112 & 108 is supported by its axles 115f & 115r; and respectively free to rotate about its axis 161 between the two protrusions 130f & 130r (that are tangent along the plane of the support cover 108) and the open slots 133f & 133r; and when the support cover 108 is inserted and fixed in place by insertion of the two protrusions 130f & 130r into the open slots 133f & 133r the free space created by this action acts as a complete rotatable magnet axle drive assembly 112 & 108 that upon triggering has bi-directional damped rotating action resulting in the damped oscillatory voltage waveform.

Figure 2A:
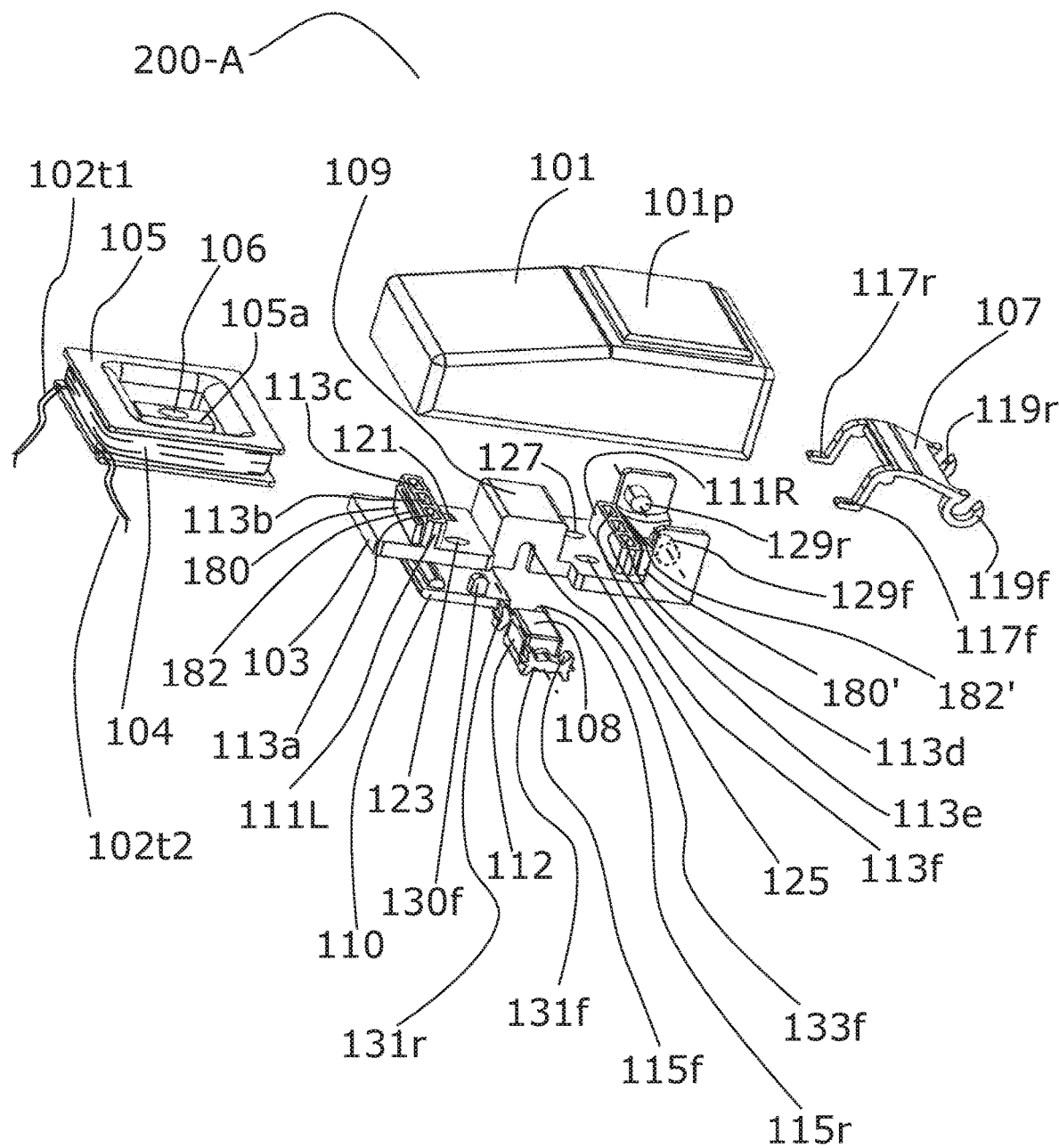
FIG. 2A is an exploded perspective rising top view of all components of the embodiment of the present invention of FIG. 1.

FIG. 2A is a "top looking down" exploded perspective drawing of the preferred embodiment of this invention showing all components for a clear understanding of the novelty of few parts required for comprising this invention. Basically, there is the base substrate 103 that has as part of its monolithic design, a centre magnet section 109 for holding in place the centre drive magnet 112 disposed within the rotatable magnet enclosure 108 (about its axis 161). In addition, there is inserted and fixed within two separate monolithic counter emf reducing magnet support subsections, a first left side focus magnet support monolithic subsection 111L and a second right side focus magnet support monolithic subsection 111R; where both left and right focus magnet support subsections are separated in distance to allow for the insertion of the coil bobbin 105 with its winding 104 and its wire terminals 102t1 & 102t2; and the sides of the coil bobbin are butt up against the inner areas of the left and right focus magnet support monolithic subsections 111L & 111R; and this arrangement brings both plurality magnets 113a, b, c & 113c, e, f disposed within the two focus magnet supports 111L & 111R as close as possible to optimise the amount of induced voltage produced during triggering.

FIG. 2A also shows the bifurcated trigger plunger 107 with its features of bifurcated protrusions, a first rear protrusion 117f and a second front protrusion 117r, and when the bifurcated trigger plunger 107 is snapped onto the dual axle protrusions 129r & 129f the bifurcated trigger plunger 107 is free to rotate about the dual axles 129r & 129f (about their common axis 163). During a triggering event, the bifurcated protrusions 117r & 117f mechanically strike (hit) the two separate inline tri-finger (tri-fingered for strength) axle tabs 132f & 132r causing clockwise rotation on the down-stroke that causes a first polarity induced voltage produced and when the bifurcated trigger plunger springs back this causes an anti-clockwise rotation that causes a second polarity (opposite to the first down-stroke polarity) going induced voltage; and in both instances an induced AC (alternating current) voltage is produced (See FIG. 8).

Figure 2B:
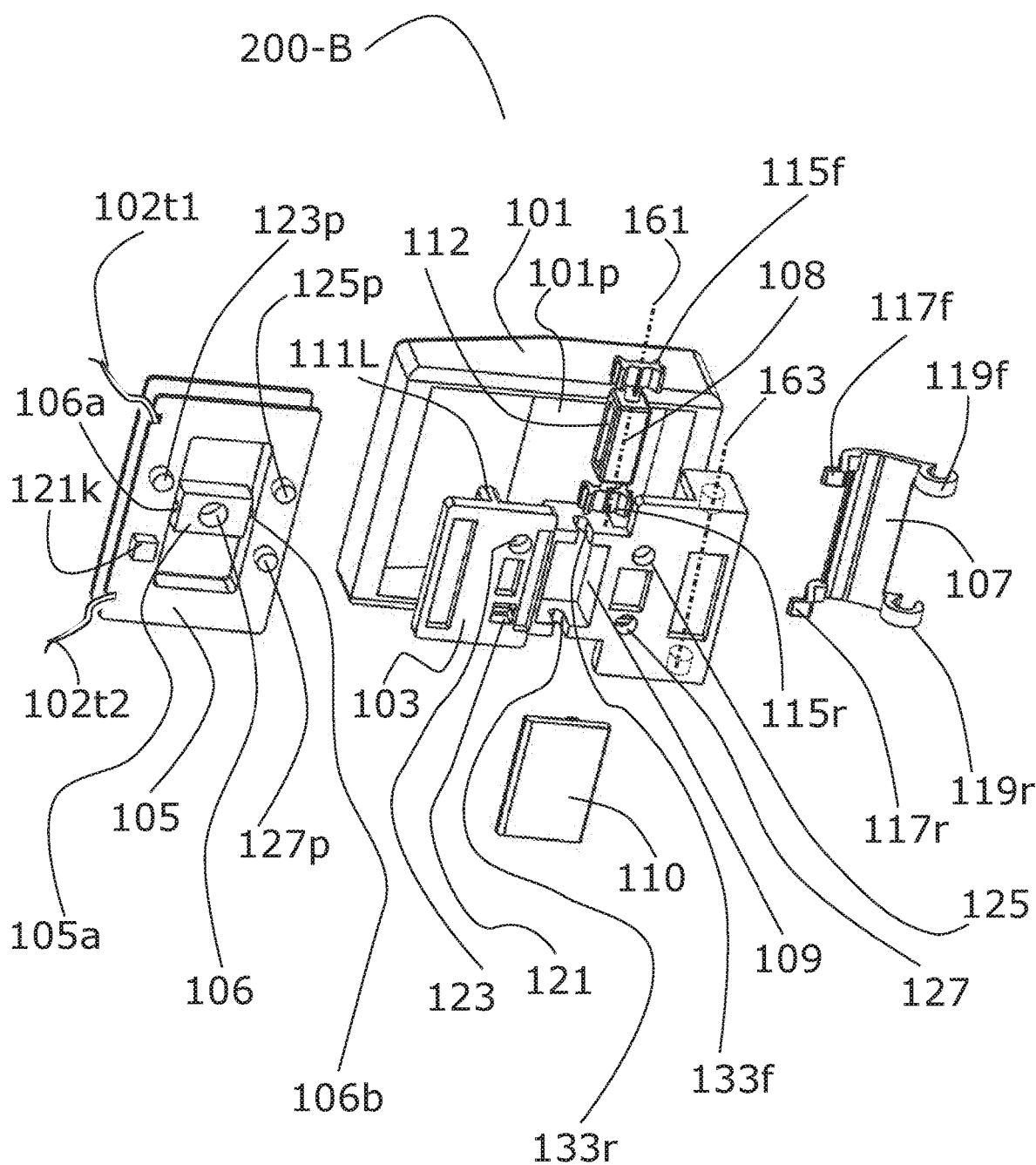
FIG. 2B is a exploded perspective rising bottom view of all components of the embodiment of the present invention of FIG. 1.

FIG. 2B is a "bottom looking up" exploded perspective drawing of the preferred embodiment of this invention showing all components for a clear understanding of the novelty of few parts required for comprising this invention and it further illustrates several feature shown from the under sections therein, where the bottom support cover 108 is inserted flush with the monolithic base substrate's 103 centre magnet monolithic base section enclosure 109 and fits into the two opposite slots 133f & 133r of the centre magnet monolithic section enclosure 109 that acts as the axle support assembly for the centre magnet axially rotatable enclosure 108 that contains the centre magnet 112. Another feature of this embodiment that is a substantial aid during production is to have the coil bobbin designed with a keyed insert slotted arrangement, where there are four uniform spaced in a rectangular paradigm position arrangement that contains four protrusions of a first protrusion that is a key 121p and three identical cylinder protrusions 123p, 125p, 127p that fit into identical through holes of a first key hole 121 and three identical through holes 123, 125, 127. for insertion and lock-in. A method of coil production with automatic coil winding machines is to allow easy quick mounting of the coil bobbin 105 on a coil winding machine and to do a fast winding procedure for a finished winding 104. This method can be accomplished easily if the coil bobbin 105 has a break-off rectangular attachment 105a at the centre of the coil bobbin 105 and at the centre of the break-off attachment 105a is a centred through hole 106 for insertion on a bobbin rod of a coil winding machine.

FIG. 2C is an exploded component view comprising the two separate plurality sets of focus directive magnets 141a, b, c and 141d, e, f that are inserted and fixed into the open blind hole slots 113a, b, c and 113d, e, f respectively and fixed within. Also in FIG. 2C is the centre magnet rotatable enclosure with its blind rectangular hole 108s that holds fixed within the centre magnet 112 (shown in FIG. 2D) and the comprised centre magnet enclosure and its magnet 112 is positioned above the enclosure support 108 and its two support protrusions 131f & 131r that are in contact at support contact points 116f & 116r with the rotatable enclosure 108 and the rotatable enclosure 108 is free to rotate about its axis 161. Where in FIG. 2D, the centre magnet 112 is disposed and fixed within the centre magnet slotted blind rectangular hole 108s and the comprised magnet 112 and its enclosure 108 are pivotal about its axis 161. The two axles 115f & 115r are contiguous with the enclosure 108 support member's 108 two separate tangent (to the plane surface of the support member 108) protrusions. The trigger receiver tabs 132f & 132r become contiguous with the bifurcated cantilever's (see FIG. 3 and FIG. 4 and FIG. 5, FIG. 6, & FIG. 7) finger tabs 117f & 117r respectively.

Figure 3:
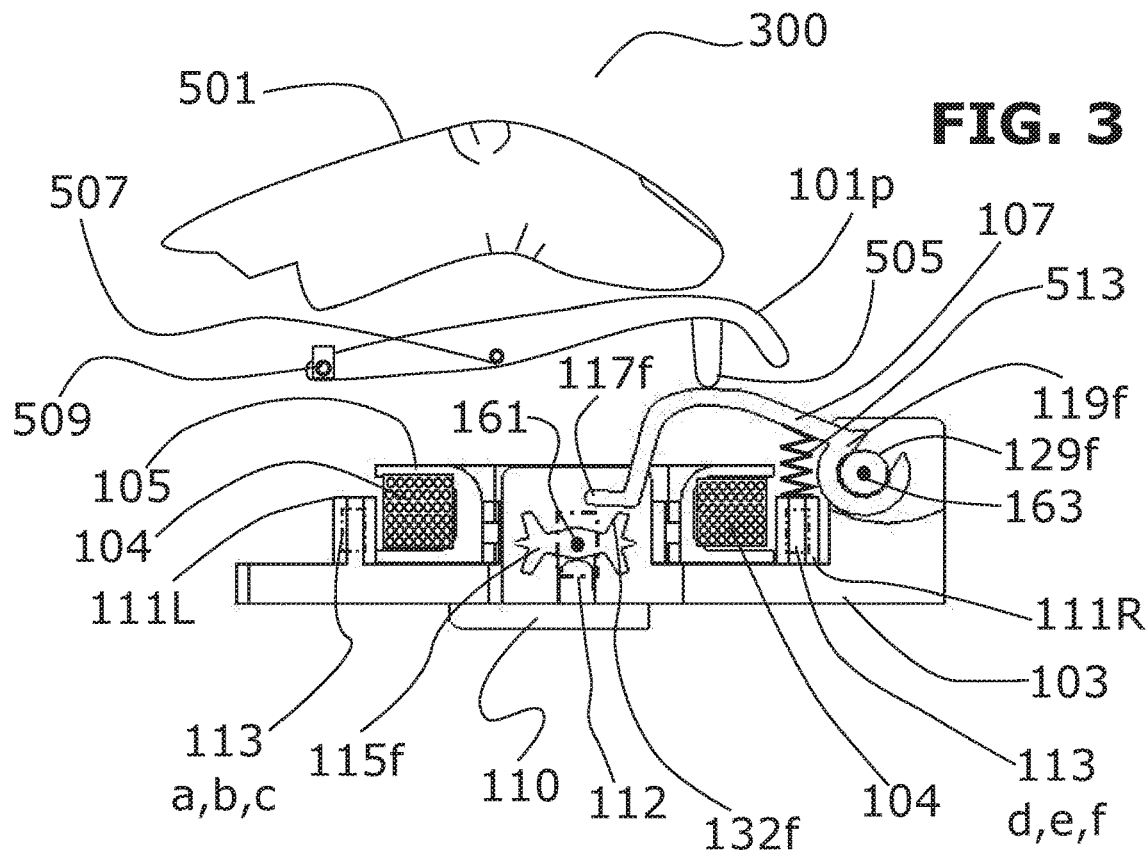
FIG. 3 is an illustration of a human finger in a pre-trigger position of depressing the movable push-button mechanism of the embodiment of the present invention of FIG. 1 and showing all of the static state moveable components.

FIG. 3 illustration 300 shows the present invention's preferred embodiment as a side cutaway view, in its static equilibrium state before a trigger is caused by the urging of the spring 513 by the push-lever 101p that experienced the urging of a finger 501 or other mechanical force source. All "action-sequential" triggering, caused by the following members, which are utilised to produce electrical power, comprised of the; [1] push-button 101p as part of the device enclosure 101, [2] the tangent extension 505 of the push-button 101p that is contiguous with the dual fork fingers 117f & 117r that are a sub-member of the bifurcated cantilever trigger member 107, [3] the spring 513 for urging forward force downward and potential-to-kinetic energy release upward (after instant release) of the bifurcated cantilever trigger member 107, whose action and reaction causes the dual fork fingers 117f & 117r to create a contiguous connexion between the dual fork tab fingers 117f & 117r, [4] and the upper tabs 132f & 132r as a sub-member of the inline axles 115f & 115r remain in a static equilibrium state until a finger 501 or some other external mechanical energy source initiates a "turn ON trigger-action" state described in FIG. 4.

Figure 4:
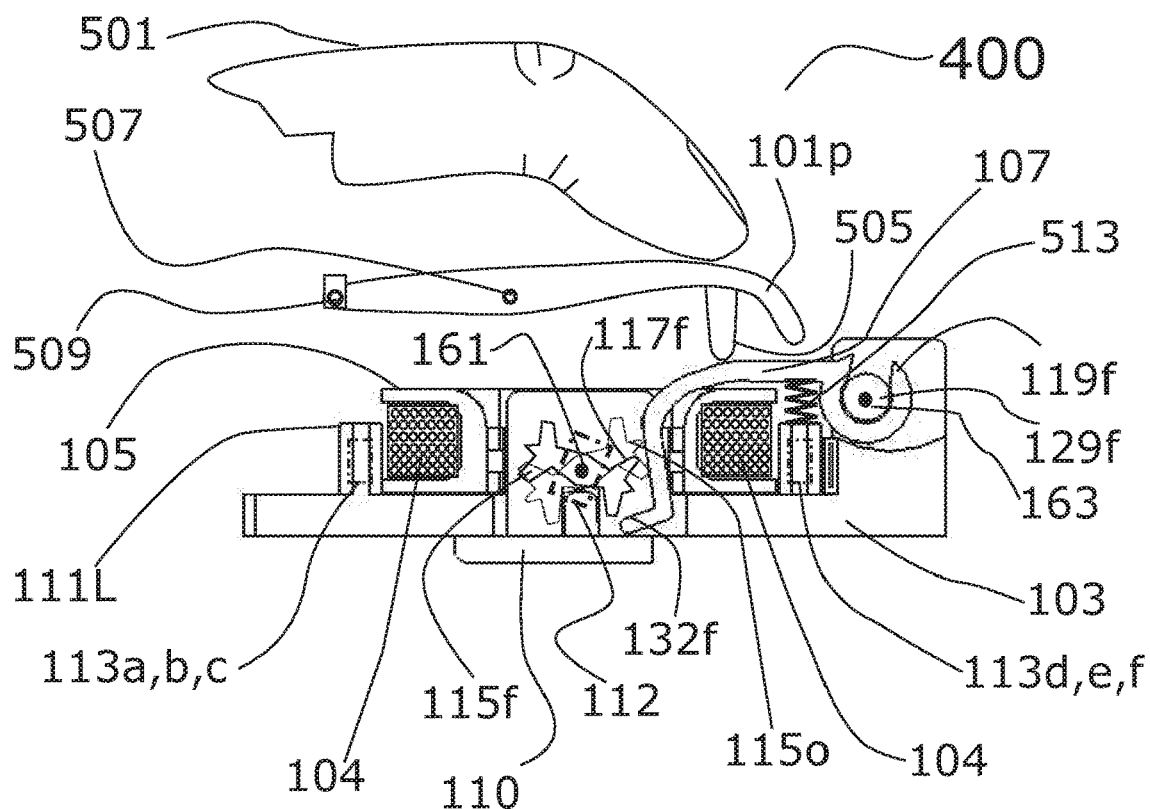
FIG. 4 is an illustration of a human finger depressing the push-button mechanism and the change of state in all of the movable components of the embodiment of the present invention of FIG. 1.

FIG. 4 illustration 400 shows the present invention's preferred embodiment as a side cutaway view, during the "turn ON action procedure" of a human finger 501 or an external trigger caused by the urging of the spring 513 by the push-lever 101p that experiences the urging of a finger 501 or other mechanical force source. The "turn ON action procedure" produces a "Rube Goldberg type action-sequential" triggering by its members that are utilized to produce electrical power by action of pressing-in, the push-button 101p that is part of the device enclosure 101, and the push-button tangent extension 505 of the push-button 101p then comes in instant contact with the dual fork cantilever 107 and whose dual fork fingers 117f & 117r that are a sub-member of the bifurcated cantilever trigger member 107.

The bifurcated cantilever trigger member 107 urges the spring 513 to produce a forward force downward and the resultant compression of the spring 513 stores potential energy that is created during this process. Then by the instant finger 501 release upward of the bifurcated cantilever trigger member 107, action and reaction that is created causes the dual fork fingers 117f & 117r to instantly create a contiguous connexion between the dual fork tab fingers 117f & 117r, and the upper tabs 132f & 132r as respective sub-members of the inline axles 115f & 115r that are part of the centre magnet 112 contained in its rotatable enclosure 108 and remain in a damped oscillatory alternating electrical energy producing state (FIG. 8) until the frictional forces diminish to a rotational stoppage of the centre magnet 112 in its rotatable enclosure 108.

Figure 5A:
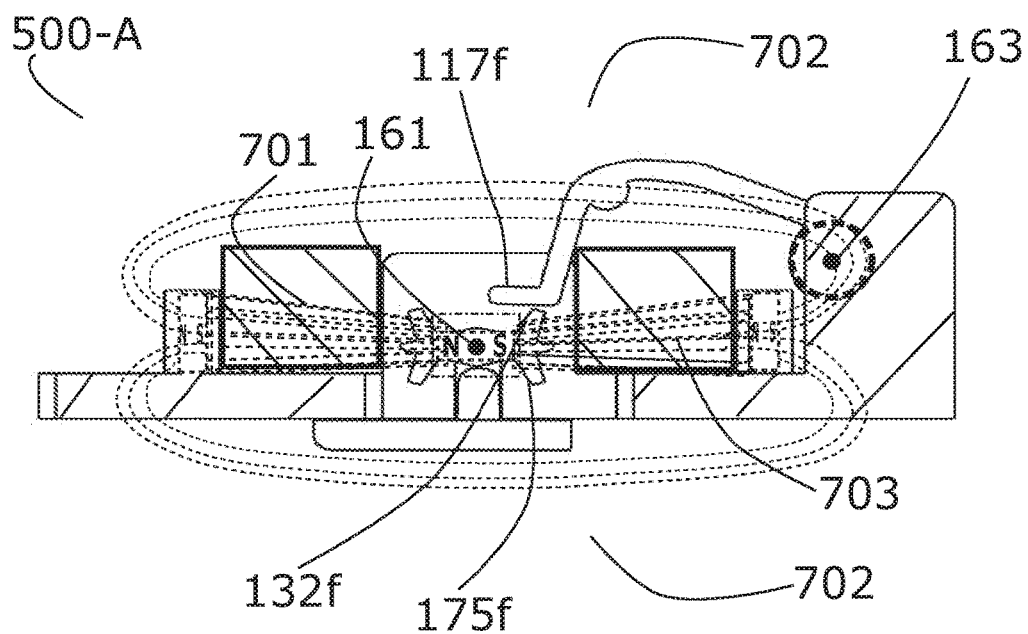
FIG. 5A is an illustration showing the equilibrium state of the comprised attractive interactive magnetic fields, including the surrounding field component above and below the coil volume, of the embodiment of the present invention of FIG. 1, with the central movable magnet that is diametrically poled and the two sets of inline lateral directive (counter emf reducing) magnets that are axially poled.

FIG. 5 is an illustration 500 of a partial cutaway view of the preferred embodiment 500 that illustrates the rest "non-trigger" state of the invention's encompassing attractive magnetic field 701 and 703 and purposely not showing (for simplicity) the complete magnetic circuitous path that travels all through the invention's embodiment but is shown for understanding in FIG. 5A.

FIG. 5A is a simplified illustration 500-A showing a complete and circuitous effective magnetic field of the invention's preferred embodiment 500-A where the surrounding magnetic field 700 extends from the outside pole of the left focus magnet inline array 113abc to the right focus magnet inline array 113 def, thus making a closed circuitous path for the magnetic lines of force. The entire inner 701 & 703 and outer overhead 702 magnetic circuit path changes (see FIG. 6 & FIG. 7) its field flux intensity through the coil 105 during the damped cyclic oscillatory bi-rotation of the centre inline axles centre magnet 112 rotatable enclosure 108 (shown in FIG. 2)

Figure 6:
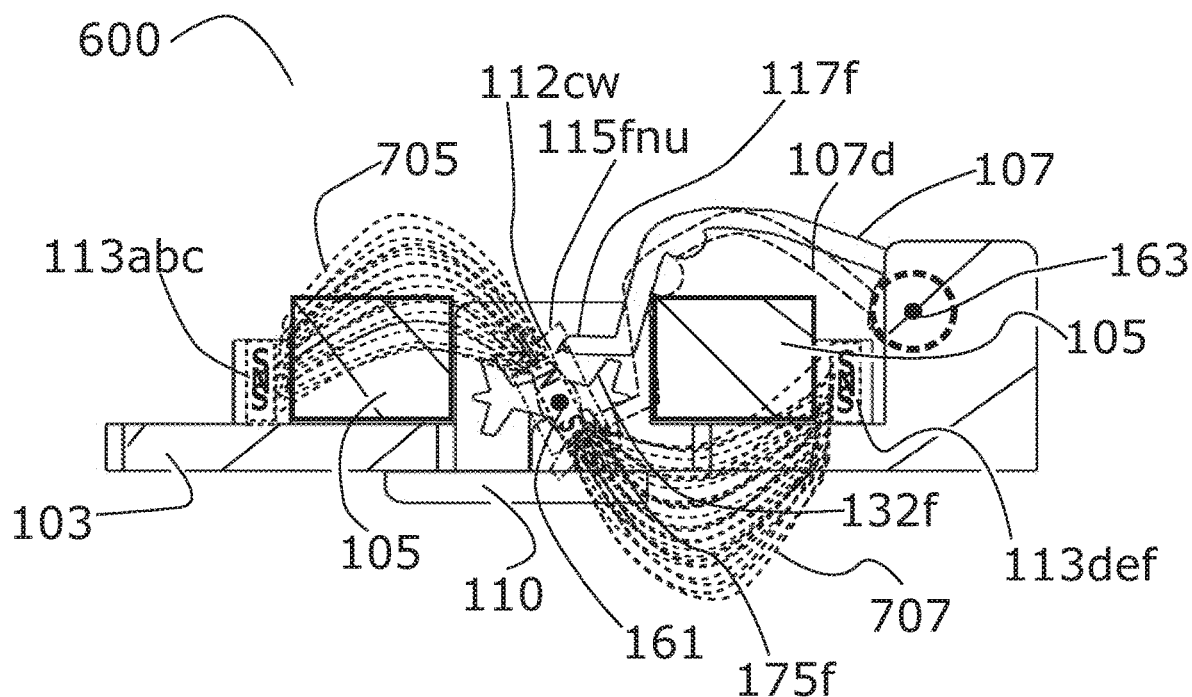
FIG. 6 is an illustration of the embodiment of FIG. 1, showing a first initial active state during a finger depression of the offset cantilever trigger mechanism and thus causing the central magnet to move; and further causing the interactive attractive magnet fields between the central magnet and the two sets of inline lateral directive (counter emf reducing) magnets to distort away from an equilibrium state.

The angular sequential induced voltage producing operation of the preferred embodiment and influence of the changing magnetic field 705 & 707 is shown in the illustration 600 in FIG. 6 during an instant of downward depression, by the urging of a finger or some other external intentional mechanical energy source (shown in FIG. 3), on the bifurcated cantilever 107 that simultaneously rotates downward 107d on its axis of rotation 163. During the instant downward depression phase, the two fork tab fingers 117f & 117r of the bifurcated cantilever 107 (note: with the cutaway views, only the front fork finger tab 117f is shown and the rear fork finger tab 117r is not shown but works instantly in parallel inline sequence) comes in instant contiguous contact with the axle tabs 132f & 132r (note: with the cutaway views, only the front inline axle tab 132f is shown and the rear inline axle tab 132r is not shown but works instantly in parallel inline sequence) causing the centre magnet 112 fitted within its rotatable enclosure 108 to rotate from 0 degrees up to 90 degrees clockwise on its axis 161 (this effectively and simultaneously causes the centre magnet 112 to rotate to a new angular position 112cw) and as the forked finger tabs 117f & 117r disconnect from a contiguous state with the rotatable magnet enclosure's 108 finger tabs 132f & 132r. The centre magnet 112 in its rotatable enclosure is free to oscillate; and this action creates the surrounding encompassing magnetic fields 701 & 703 to change periodically in a sinusoidal movement 705, 707, 709, 711. This periodic clockwise rotation of the centre magnet 112 simultaneously in union within its enclosure 108 causes a changing left magnetic field 701/705 that firstly passes up through the left side of the coil 105 and simultaneously the changing right magnetic field 703/707 secondly passes down through the right side of the coil 105; thus producing an instant first half sinusoidal duty cycle of induced EMF (voltage) that is felt at the coil terminals (102ti & 102t2 shown in FIG. 1). Once the bifurcated tab fingers 117f & 117r moves past the maximum point of contiguous connexion with the inline axle finger tabs 132f & 132r, both members are noncontiguous and the centre magnet 112 in its rotatable enclosure 108 and its contained centre magnet 112 is free to oscillate between a diminishing repeating travel angle range of 0° to +90° (112cw), to 0° to −90° (112acw), back to 0° with decreased terminal EMF (voltage) following a mathematical path conforming to the damping values of $X^e$ (173, as shown in FIG. 8). This first cyclic duration of the downward depression phase; gives way to the second cyclic duration when the "contiguous-to-noncontiguous" finger 501 to bifurcated cantilever plunger 107 connexion is forced back upward by the stored potential energy in the spring 513, being converted to upward (spring expanding) kinetic energy (explained in FIG. 7)

Figure 7:
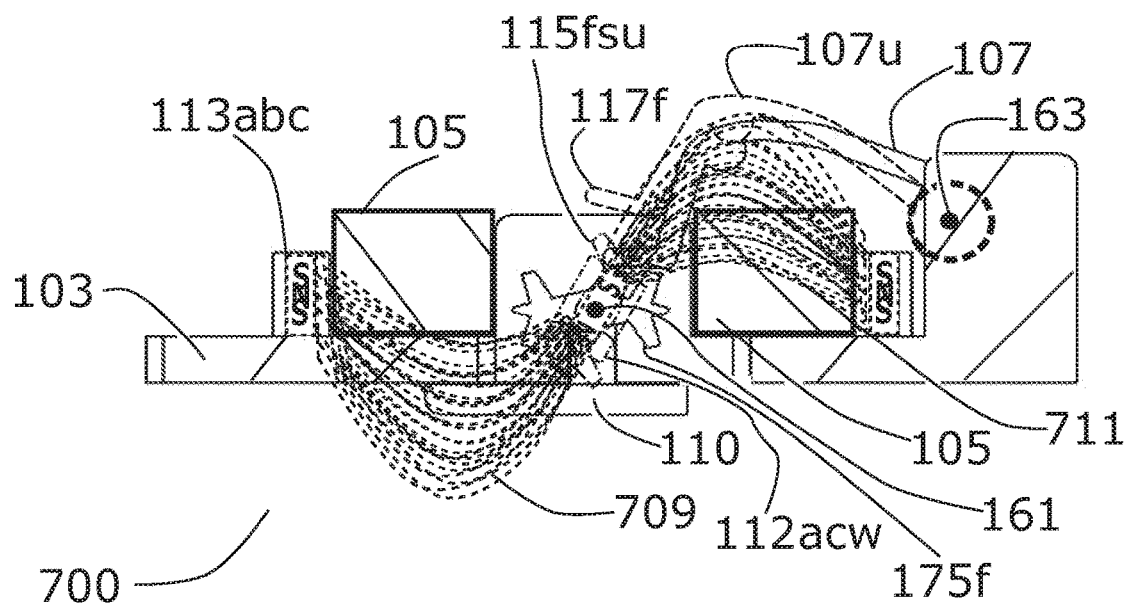
FIG. 7 is an illustration of the embodiment of FIG. 1 showing a second active state when a finger that depresses the cantilever trigger mechanism is released from the offset cantilever trigger mechanism and the central magnet is free to rotate and mechanically oscillate to move and thus further causing the interactive attractive magnet fields between the central magnet and the two sets of inline lateral directive (counter emf reducing) magnets to distort away from an equilibrium state; and during this period the damped sinusoidal voltage waveform, of substantial time duration, is produced at the coil terminals.
Figure 8:
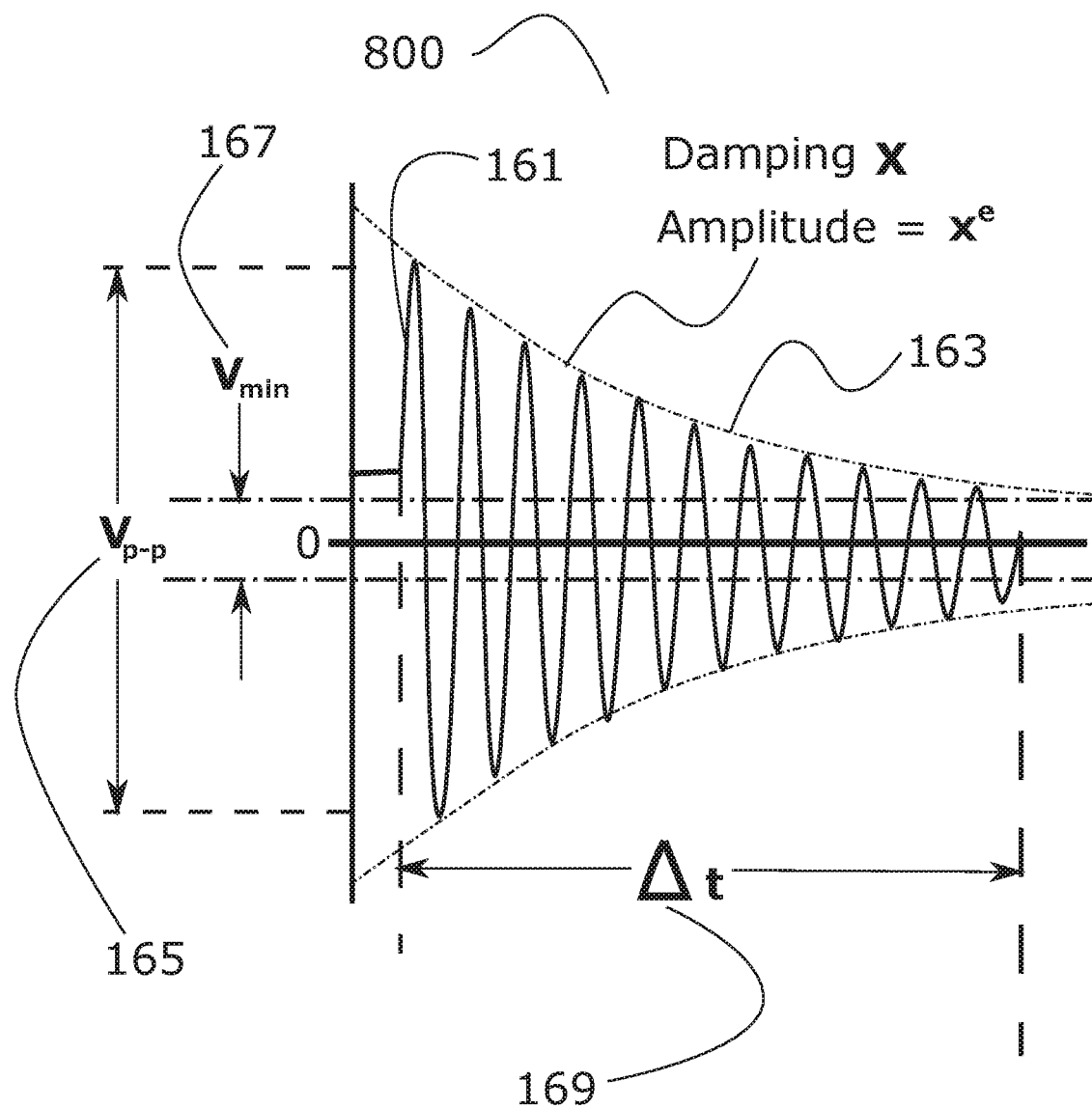
FIG. 8 is a typical damped sinewave voltage output waveform showing peak-to-peak voltage and the minimum acceptable operational voltage levels (e.g. 1.8 to 3.3 volts) for micro-transmitter chips currently in the marketplace.

FIG. 7 illustration 700 represents the duration when the bifurcated cantilever springs back 107u to its non-triggered rest position 107. This spring 513 produced forced action causes the bifurcated tabs 117f & 117r to endure a contiguous connexion between the enclosure 108 finger tabs 175f & 175r that causes magnet 112 in its rotatable enclosure 108 to rotate anti-clockwise 112acw to +90° and when the dual fingered cantilever 107 travels to its non-triggered rest position, the centre magnet enclosure with its enclosed centre magnet 112 are free to oscillate between a diminishing repeating travel angle range of 0° to −90° (112acw), to 0° to +90° (112cw), back to 0° with decreased terminal EMF (voltage) that following a mathematical path conforming to the damping values of $X^e$ (173, as shown in FIG. 8).

FIG. 8 is a graph 800 of a typical generated AC (alternating current) peak-to-peak $V_{p-p}$ 165 voltage waveform 161 by the present invention over a time duration of Δt 169, firstly under a no electrical load appliance connected at the coil terminals; and second the generated AC (alternating current) peak-to-peak $V_{p-p}$ 165 voltage waveform 161 affected by an electrical load appliance connected to the coil terminals. Following the same damping effect $X^e$ 163 for each case by friction on the invention's embodiment producing the voltage, providing and indicium of the reduction in power output increase as the electrical load increases by nature.

Figure 9:
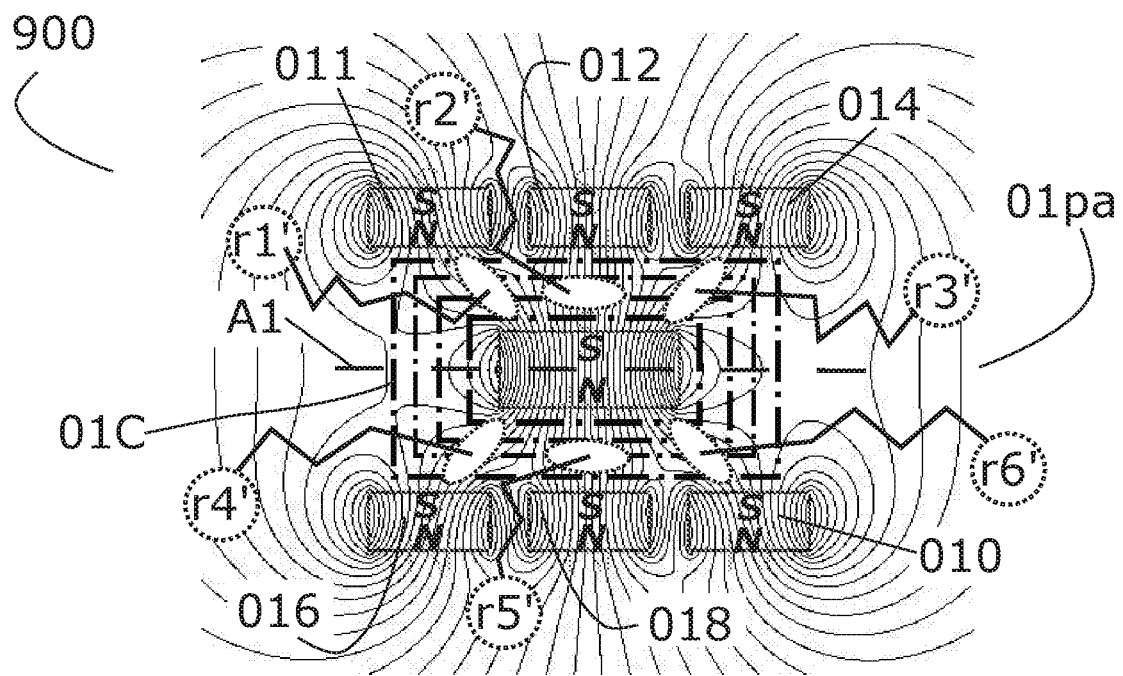
FIG. 9 is a magnetic field concentration of a prior art embodiment using a uniform horizontal inline column arrangement of a plurality of magnets, all poled in the same direction in a horizontal plane and a plurality of those column arrangements in a plurality of rows; and in a special case of a three by two column-row instance there is a centred single rotatable magnet along its horizontal axis; where the rotatable magnet is poled in a moment of time in one direction through a complete possible rotation.

FIG. 9 is a top comparison illustration 900 of the prior art 01pa that depicts a first plurality arrangement of magnets and in this referred to exemplary embodiment there are two separated sets of three inline disk magnets with all of their magnetic poles aligned in the same and parallel direction. The first set consists of a first inline magnet 011 with South pole up (along a line in the plane of the drawing, i.e. "in paper") and North pole down (in paper), a closely separated centre inline second magnet 012 with South pole up (in paper) and North pole down (in paper), and a third closely separated inline magnet 014; and a second set of a first inline magnet 016 with South pole up (in paper) and North pole down (in paper), a closely separated centre inline second magnet 018 with South pole up (in paper) and North pole down (in paper), and a third closely separated inline magnet 010. Then there is a rotatable centred and separated equidistance between the two described magnet sets, and this centred rotatable magnet is disposed in a centre region of a coil winding 01C. FIG. 9 represents the centre magnet 020 in a moment during cyclic rotation about its axis A1 when its South pole is up (in paper) and its North pole is down (in paper). The resultant lines of force contours that encompass the coil winding 01C during that moment in time when the rotating magnet 020 is parallel to the horizontal plane of the coil winding 01C. This stopped moment in time is when the induced AC voltage sinusoidal waveform is going through its instantaneous zero value. The magnetic lines of force for these comparisons was done by using a two dimensional visual software programme for calculating and displaying magnetic lines of force. The magnetic intensity contour plot shows a uniform distribution without any strong lines of force density with the area of the coil winding, and that would conclude an non-optimized design feature that would "not" offer any optimized maximum power generation from the generator.

Also in the illustration of FIG. 9 are the prior art's magnetic contour plotted regional zones where all of the magnetic flux regions are attractive showing relative magnetic flux densities; there are four marginal attractive magnetic flux density zonal regions r1', r3', r4', & IV that pass through the coil winding 01C due to the top row magnets 011, 012, 014 all being of the same attractive magnetic pole alignment S↓N; and there are two marginal magnetic flux density attractive zonal regions r2' & r5 all being of the same attractive magnetic pole alignment S↓N.

Figure 10:
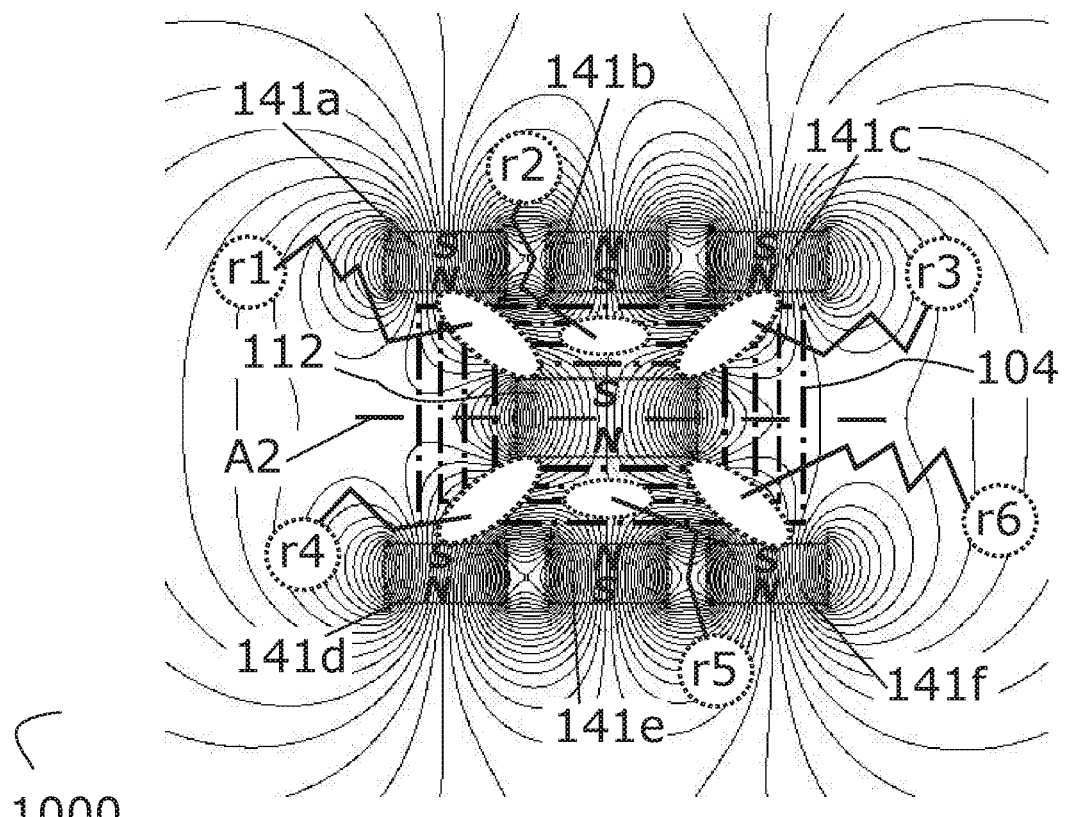
FIG. 10 is a magnetic field concentration of a novel magnet arrangement according to an embodiment of the present invention, that in contrast to FIG. 9 of prior art is a uniform horizontal inline column arrangement of a plurality of magnets, where the centre magnet is pole in an opposite direction to the remaining other member magnets, in a horizontal plane and a plurality of those column arrangements in a plurality of rows; and in a special case of a three by two column-row instance there is a centred single rotatable magnet along its horizontal axis; where the rotatable magnet is poled in a moment of time in one direction through a complete possible rotation.

FIG. 10 shows an illustration 1000 for novel and advantageous features of the present invention's magnetic array over that of the referenced prior art 01pa in FIG. 9. Now with the array according to one embodiment of the present invention, there exists a first set consisting of a first inline magnet 141a with its South pole up (in paper) and North pole down (in paper), a closely separated all important centre inline second magnet 141b with its North pole up (in paper) and with its South pole down (in paper), and a third closely separated inline magnet 141c with its South pole up (in paper) and its North pole down (in paper); and a second set of a first inline magnet 141d with South pole up (in paper) and North pole down (in paper), a closely separated all important centre inline second magnet 141e with North pole up (in paper) and South pole down (in paper), and a third closely separated inline magnet 141f with its South pole up (in paper) and with its North pole down (in paper). Then there is a rotatable centred and separated equidistance between the two described magnet sets, and this centred rotatable magnet is disposed in a centre region of a coil winding 104. FIG. 10 represents the centre magnet 112 in a moment during cyclic rotation about its axis A2 when its South pole is up (in paper) and its North pole is down (in paper). The resultant lines of force contours that encompass the coil winding 104 during that moment in time when the rotating magnet 112 is parallel to the horizontal plane of the coil winding 104. This stopped moment in time is when the induced AC voltage sinusoidal waveform is going through its instantaneous zero time derivative value. The magnetic intensity contour plot shows a densely concentrated magnetically attractive zonal distribution with strong magnetic flux lines of force density r1, r3, r4, & r6 passing through the area of the coil winding 104 and moderate repulsive magnetic flux lines of force density r2 &r5 passing through the coil winding 104, and that would conclude the "Magnet Array" does offer and teach, by empirical evidence, a novel optimized design feature for maximum power generation from the present invention generator over that of the cited prior art 01pa.

Also in the illustration of FIG. 10 are the prior art's magnetic contour plotted regional zones at magnetic equilibrium (pre-triggering) where there are attractive and repulsive magnetic flux regions showing relative magnetic flux densities; there are four separate proximal-distal substantially attractive angular magnetic flux density zonal regions id, r3, r4, & r6, attractive N↑S in respect to the centre rotatable magnet 112 S↓N in this moment in time of magnetic equilibrium and the flux line contours, at a cosine angle vector value, pass substantially strong through the coil winding 104 due to the two separate top row end magnets 141a, & 141c being of the same attractive magnetic pole alignment N↑S, but the centre top row magnet 141b is like-poled S↓N; and is repulsive to the centre magnet 112; and there are two separate inline marginal magnetic flux density repulsive zonal regions r2 & r5 all being of the same repulsive magnetic pole alignment S↓N as the centre rotational magnet 112. Also aiding and magnetically encouraging the four separate attractive zonal regions r1, r3, r4, & r6 are the common inter proximal attractive coupling between the top row's first 141a and third 141c members' and the top row centre magnet 141b plus the bottom row's common inter-proximal attractive coupling between first 141d and third 141f members' and the bottom row centre magnet 141e; this inter-proximal coupling effect allows for increased bidirectional rotation performance. In conclusion, this inter coupling reduces significantly the number of repelling flux in the region of the centre zone region r2, and provides less repelling flux, which allows for more attractive zones r1 & r3 and r4 & r6, which in turn when triggered, the generator bi-directional rotational operation will rotate with increased velocity and will generate a longer time duration damped sinusoidal voltage waveform compared to prior art. All of these dynamically changing coupling factors allow for an improved method of generator operational output.

Figure 11:
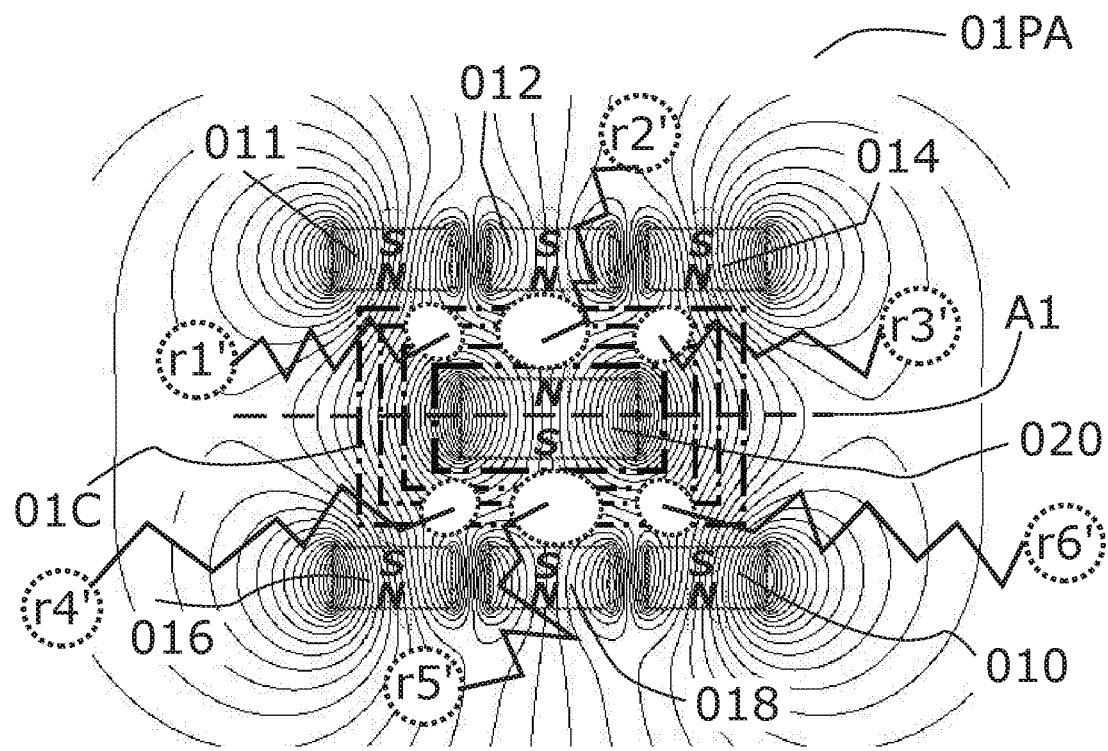
FIG. 11 is a magnetic field concentration of prior art (e.g.

FIG. 11 is a top comparison illustration 1100 of the prior art 01pa that depicts a first plurality arrangement of magnets and in this referred to exemplary embodiment there are two separated sets of three inline disk magnets with all of their magnetic poles aligned in the same and parallel direction. The first set consists of a first inline magnet 011 with South pole up (in paper) and North pole down (in paper), a closely separated centre inline second magnet 012 with South pole up (in paper) and North pole down (in paper), and a third closely separated inline magnet 014; and a second set of a first inline magnet 016 with South pole up (in paper) and North pole down (in paper), a closely separated centre inline second magnet 018 with South pole up (in paper) and North pole down (in paper), and a third closely separated inline magnet 010. Then there is a rotatable centred and separated equidistance between the two described magnet sets, and this centred rotatable magnet is disposed in a centre region of a coil winding 01C. FIG. 11 represents the centre magnet 020 in a moment during cyclic rotation about its axis A1 when its North pole is up (in paper) and its South pole is down (in paper). The resultant lines of force contours that encompass the coil winding 01C during that moment in time when the rotating magnet 020 is parallel to the horizontal plane of the coil winding 01C. This stopped moment n time is when the induced AC voltage sinusoidal waveform is going through its instantaneous maximum value. The magnetic lines of force for these comparisons was done by using a two dimensional visual software programme for calculating and displaying magnetic lines of force. The magnetic intensity contour plot shows a uniform distribution without any strong lines of force density with the area of the coil winding, and that would conclude an non-optimized design feature that would "not" offer any optimized maximum power generation from the generator.

Also in the illustration of FIG. 11 are the prior art's magnetic contour plotted regional zones where magnetic regions are all repulsive showing relative magnetic flux densities; there are four concentrated repulsive magnetic flux density zonal regions r1', r3', r4', & r6' that pass away from the coil winding 01C due to the top row magnets 011, 012, 014 all being of the same magnetic pole alignment S↓N repulsive to the rotatable centre magnet 020 in a repulsive N↑S moment in time; and there are two marginal magnetic flux density repulsive zonal regions r2' & r5' all being of the same magnetic repulsive pole alignment S↓N. This moment in time during a triggered rotation is the most unstable and therefore the effective rotational zone limit is between zero degrees (pole vector horizontal and ninety degrees (pole vector vertical a practically though, with the prior art the degree of freedom for rotation with the prior art is approximately 80 to 85 degrees depending on design tolerances for the trigger mechanism.

Figure 12:
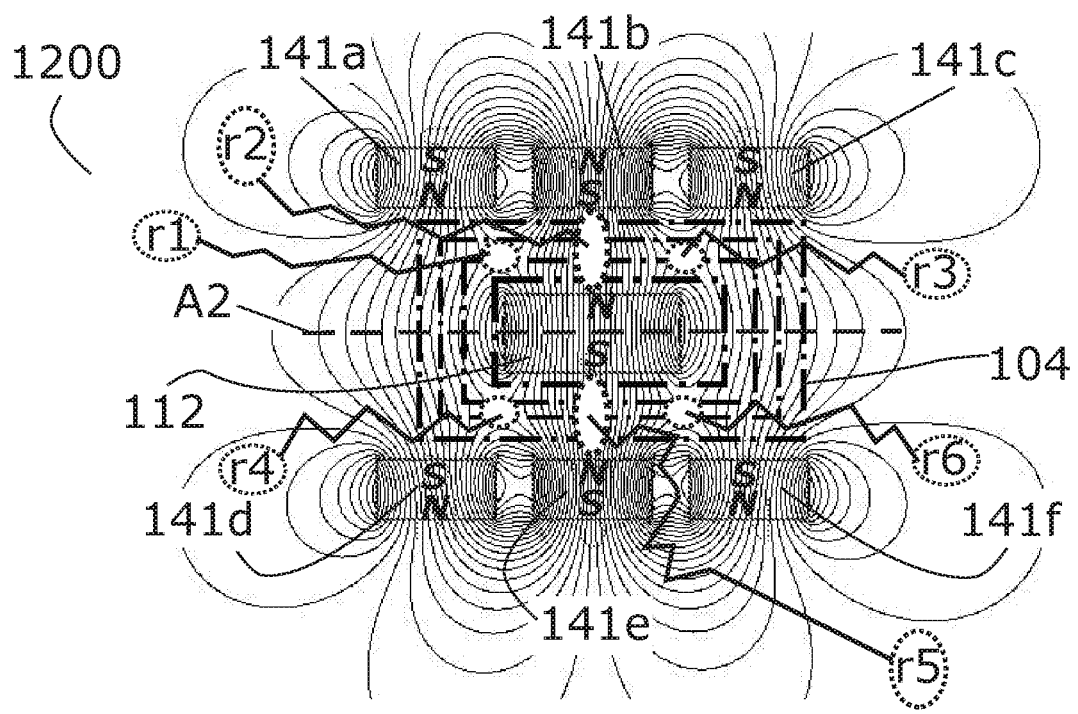
FIG. 12 is a magnetic field concentration of a novel counter emf reducing magnet arrangement embodiment according to the present invention, that in contrast to FIG. 11 of prior art is a uniform horizontal inline column arrangement of a plurality of magnets, where the centre magnet is pole in an opposite direction to the remaining other member magnets, in a horizontal plane and a plurality of those column arrangements in a plurality of rows; and in a special case of a three by two column-row instance there is a centred single rotatable magnet along its horizontal axis; where the rotatable magnet is poled in a moment of time in a direction opposite to that of FIG. 10 direction through a complete possible rotation.

FIG. 12 shows an illustration 1200 for novel and advantageous features of one embodiment of the present invention's magnetic array over that of the referenced prior art 01pa in FIG. 9. Now with the embodiment of the present invention shown, there exists a first set consisting of a first inline magnet 141a with its South pole up (in paper) and North pole down (in paper), a closely separated all important centre inline second magnet 141b with its North pole up (in paper) and with its South pole down (in paper), and a third closely separated inline magnet 141c with its South pole up (in paper) and its North pole down (in paper); and a second set of a first inline magnet 141d with South pole up (in paper) and North pole down (in paper), a closely separated all important centre inline second magnet 141e with North pole up (in paper) and South pole down (in paper), and a third closely separated inline magnet 141f with its South pole up (in paper) and with its North pole down (in paper). Then there is a rotatable centred and separated equidistance between the two described magnet sets, and this centred rotatable magnet is disposed in a centre region of a coil winding 104. FIG. 10 represents the centre magnet 112 in a moment during cyclic rotation about its axis A2 when its South pole is up (in paper) and its North pole is down (in paper). The resultant lines of force contours that encompass the coil winding 104 during that moment in time when the rotating magnet 112 is parallel to the horizontal plane of the coil winding 104. This stopped moment in time is when the induced AC voltage sinusoidal waveform is going through its instantaneous maximum time derivative value. The magnetic intensity contour plot shows a densely concentrated distribution with strong lines of force density within the area of the coil winding, and that would conclude the embodiment(s) of the present invention does offer and teach, by empirical evidence, an novel optimized design feature for maximum power generation from the present invention generator over that of the cited prior art 01pa.

Also in the illustration of FIG. 12 are the prior art's magnetic contour plotted regional zones at magnetic equilibrium (pre-triggering) where there are attractive and repulsive magnetic flux regions showing relative magnetic flux densities; there are four separate proximal-distal substantially moderate repulsive angular magnetic flux density zonal regions r1, r3, r4, & r6, repulsive N↑S in respect to the centre rotatable magnet 112 N↑S in this moment in time of magnetic equilibrium (pre-triggering), and the flux lines at a cosine angle vector value, repel substantially moderate away from the coil winding 104 due to the two separate top row end magnets 141a, & 141c being of the same repulsive magnetic pole alignment N↑S, but the centre top row magnet 141b and the centre bottom row magnet 141e are both opposite-poled S↓N and they are proximal attractive to the centre rotational magnet 112; and there are two separate inline marginal magnetic flux density attractive zonal regions r2 & r5 all being of the same attractive magnetic pole alignment S↓N as the centre rotational magnet 112. Also affecting and magnetically limiting the four separate repulsive zonal regions a1, r3, r4, & r6 are the common angular inter proximal attractive coupling between the top row's first 141a and third 141c members' and the top row centre magnet 141b plus the bottom row's common angular inter proximal attractive coupling between first 141d and third 141f members' and the bottom row centre magnet 141e; this effect allows for increased bidirectional rotation performance. In conclusion, this inter coupling reduces significantly the number of changing repelling flux in the region of the top row first zone region r1 and third zone region r3 plus bottom fourth zone region r4 and sixth zone region r6; and provides less repelling flux, which allows for more attractive magnetic flux zones' r2 & r5 desired rotational torque, when triggered, the generator bi-directional rotational operation will rotate with increased velocity and will generate a longer time duration damped sinusoidal voltage waveform compared to prior art. All of these dynamically changing coupling factors allow for an improved method of generator operational output.

The Array of Magnets

Figure 13:
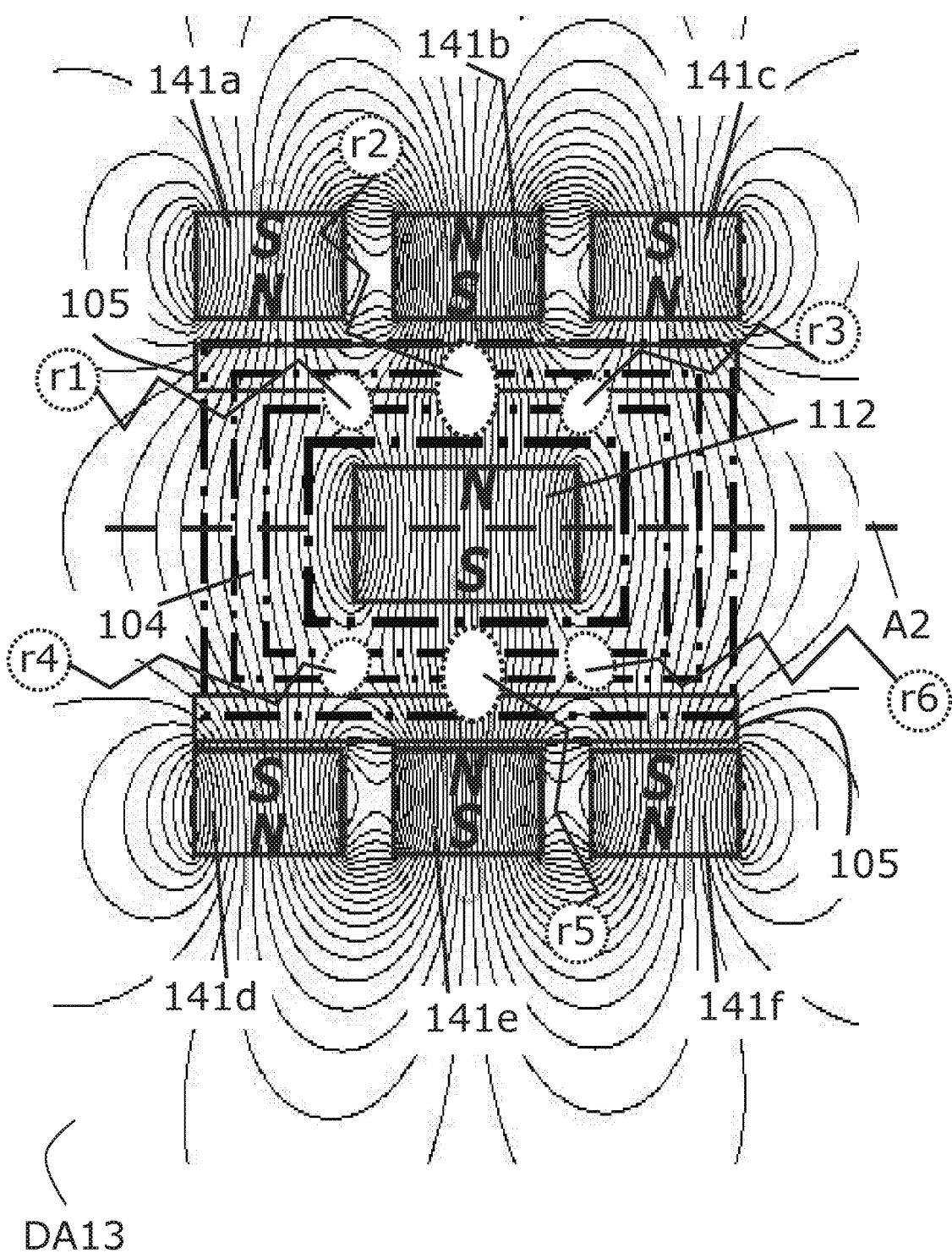
FIG. 13 shows the composite resultant magnetic fields surrounding the coil winding caused by an embodiment of the present invention of FIG. 12 affect during a maximum induced voltage segment of time.
Figure 14:
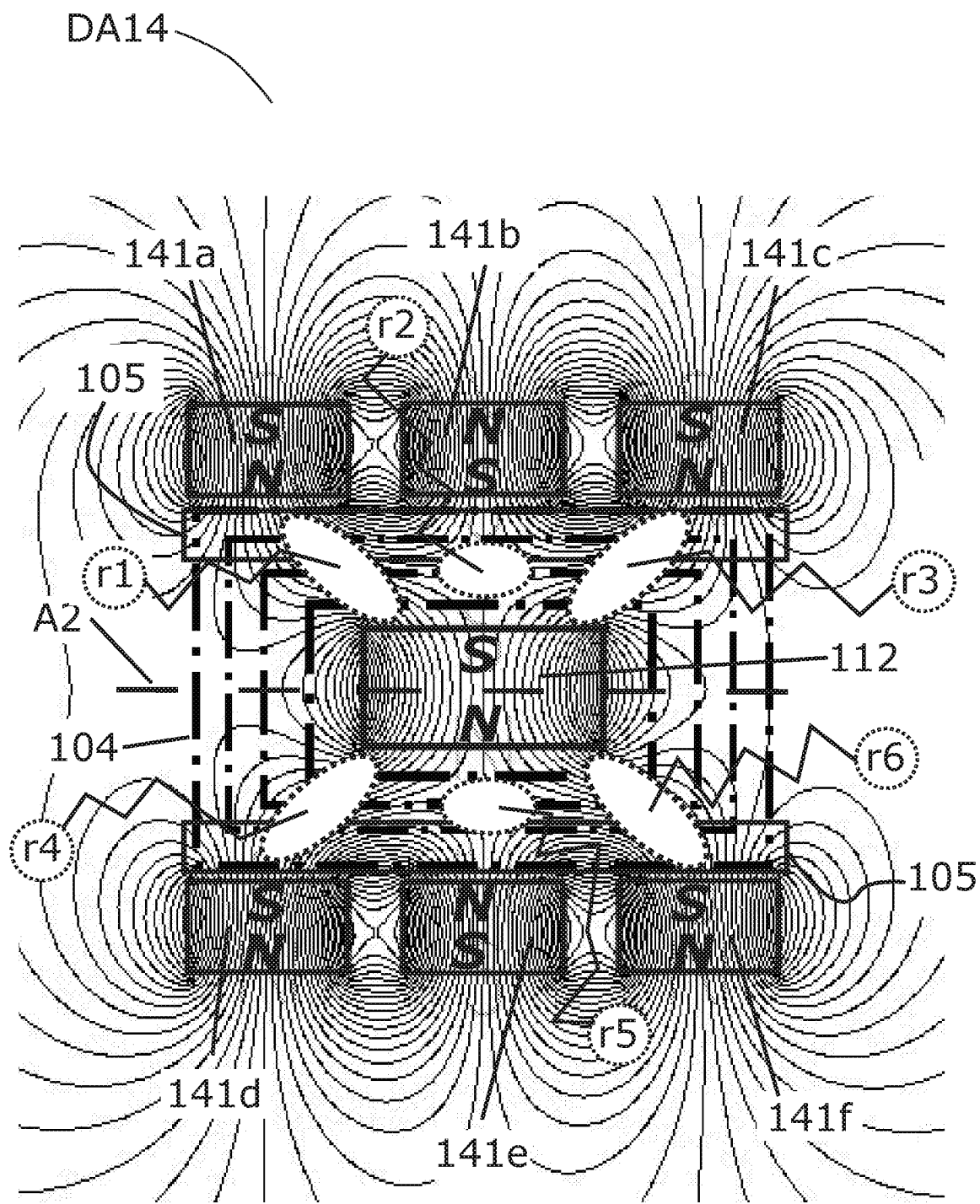
FIG. 14 shows the composite resultant magnetic fields surrounding the coil winding caused by an embodiment of the present invention of FIGS. 10, 12 and/or 13.

FIG. 13 and FIG. 14 are illustrations of an embodiment of the present invention having a plurality of rows and columns of magnets including a plurality of inline magnets set up as a matrix, and for this present invention, there are rare earth disk magnets arranged in a three column by two row array (matrix), where each column member magnet is separated proximal from each other and each row of three member magnets is separated distal from each other; for this present invention's embodiment, and what distinguishes and renders novel is in each row is the magnetic pole alignment of each member magnet to each other. The arrangement is such that their respective "up & down" magnetic pole circuitous alignment exists so that there is a first set of a $1^{st}$ member 141a with S↓N (poled S facing up), a $2^{nd}$ member 141b with N↑S (poled N facing up in paper), and a $3^{rd}$ member 141c with S↓N (poled S facing up in paper) and they are all separated on one side proximal of a coil bobbin 105 with its wire winding 104 and on a side opposite the coil bobbin with its wire winding is a disposed second set of a 1st member 141d with S↓N (poled s facing up in paper), a $2^{nd}$ member 141e with N↑S (poled N facing up in paper), and a $3^{rd}$ member 141f with S↓N (poled S facing up in paper); and disposed centred within the coil bobbin 105, is a rotatable about its axis, magnet. From this row and column arrangement is established a "complex-pole produced" three dimensional magnetic flux field encompassing the coil and its winding that is disposed in between the two rows of magnets and the rotatable centre magnet disposed within the coil bobbin (with symmetrically centred hollow core). Ergo, by analysis with the first row members there exists; an attractive static magnetic field between proximal retained $1^{st}$ row member 141a and proximal retained $2^{nd}$ row member 141b, and an attractive magnetic field between proximal retained $2^{nd}$ row member 141b and proximal retained $3^{rd}$ row member 141c; and with the second row members there exists; an attractive static magnetic field between proximal retained $1^{st}$ row member 141d and proximal retained $2^{nd}$ row member 141e, and an attractive magnetic field between proximal retained $2^{nd}$ row member 141e and proximal retained $3^{rd}$ row member 141f. There exists a static attractive magnetic field between the $1^{st}$ magnet 141a of the first row and the $1^{st}$ magnet member 141d of the second row distal. There exists a static attractive magnetic field between the $3^{rd}$ magnet member 141c of the first row and the $3^{rd}$ magnet member 141f of the second row distal. There is disposed a first changing differential function magnetic field region between the 2nd magnet member 141b (centre position) of the first row and a first width side of the rotatable centre magnet 112 disposed and free to rotate about its axis of rotation and there is disposed a second changing differential function magnetic field region between the $2^{nd}$ magnet member 141e (centre position) of the second row and a second opposite width side of the rotatable centre magnet 112 disposed and free to rotate about its axis of rotation. Their combined respective magnetic field polarity is arranged in a completed attractive magnetic force circuit, such that in a rest state with no triggering action, the bi-directionally axially rotatable magnet disposed within the centre of the coil winding are in a magnetic equilibrium position (minimum mechanical energy state of the rotatable magnet).

FIG. 13 shows the "complex-pole produced" magnetic flux field distribution during a time when the instantaneous rotating of the centre rotatable magnet 112 is rotating about its axis A2 and the rotatable magnet 112 is in a proximal and perpendicular to the axis of rotation A2 "attractive-opposite-pole magnetic alignment" with the first row centre magnet member 141b, and the rotatable magnet 112 is in a proximal and perpendicular to the axis of rotation A2 "attractive opposite pole magnetic alignment" with the second row centre magnet member 141e; and in this instantaneous time the induced output voltage of the generator is going through the maximum induced generator output voltage duration. In addition during this time there is a proximal-distal angular, against the rotation axis A2, repelling like pole magnetic alignment between the first row's $1^{st}$ magnet member 141a and the rotating centre magnet 112; and there is a proximal-distal angular, against the rotation axis A2, repelling like pole magnetic alignment between the first row's 3rd magnet member 141c and the rotating centre magnet 112.

Simultaneously as shown in FIG. 13 the "complex-pole produced" magnetic flux field distribution during a time when the instantaneous rotating of the centre rotatable magnet 112 is rotating about its axis A2 and the rotatable magnet 112 is in a proximal and perpendicular to the axis of rotation A2 "attractive opposite pole magnetic alignment" with the first row centre magnet member 141b, and the rotatable magnet 112 is in a proximal and perpendicular to the axis of rotation A2 "attractive opposite pole magnetic alignment" with the second row centre magnet member 141e; and in this instantaneous time the induced output voltage of the generator is going through the maximum induced generator output voltage duration. In addition during this time there is a proximal-distal angular, against the rotation axis A2, repelling like pole magnetic alignment between the second row's $1^{st}$ magnet member 141d and the rotating centre magnet 112; and there is a proximal-distal angular, against the rotation axis A2, repelling like pole magnetic alignment between the second row's 3rd magnet member 141f and the rotating centre magnet 112.

The resultant perpendicular summation of the proximal attractive magnetic forces acting between the first row centre magnet 141b and the second row centre magnet 141e on the rotating centre magnet and the accompanying magnetic field proximal density induces an AC current within the coil winding 104 and this combined with the angular summation of the proximal-distal repelling magnetic forces between the rotating magnet 112 and the second row's $1^{st}$ magnet 141d and the proximal-distal repelling magnetic forces between the rotating magnet 112 and the second row's $3^{rd}$ magnet 141f. causes a reduction in the overall rotational torque acting on the rotatable magnet 112 and the advantage of this overall action of angular force vectors that are affected by Ampere's Law describing the effects of eddy currents within the coil and also the rotating magnet and creating a opposing field vector [∇×H=J (H=magnetizing field, J=current density)] that is the counter emf of Lenz's Law shown by the negative sign in Faraday's law of induction, and the Lorentz Forces [F=qvB·sin Θ] on moving charges results in a longer time duration for the damped sine wave when an electrical load is applied to the coil producing voltage.

FIG. 14 shows the "complex-pole produced" magnetic flux field distribution during a time when the instantaneous rotating of the centre rotatable magnet 112 is rotating about its axis A2 and the rotatable magnet 112 is in a "repelling-like-pole magnetic alignment" with the first row centre magnet member 141b, and the rotatable magnet 112 is in a proximal and perpendicular to the axis of rotation A2 "repulsive opposite pole magnetic alignment" with the second row centre magnet member 141e; and in this instantaneous time the induced output voltage of the generator is going through the minimum induced generator output voltage duration. In addition during this time there is a proximal-distal angular, against the rotation axis A2, attractive-opposite-pole magnetic alignment between the first row's $1^{st}$ magnet member 141a and the rotating centre magnet 112; and there is a proximal-distal angular, against the rotation axis A2, attractive-opposite-pole magnetic alignment between the first row's 3rd magnet member 141c and the rotating centre magnet 112.

Simultaneously as shown in FIG. 14 the "complex-pole produced" magnetic flux field distribution during a time when the instantaneous rotating of the centre rotatable magnet 112 is rotating about its axis A2 and the rotatable magnet 112 is in a proximal and perpendicular to the axis of rotation A2 "repelling-like-pole magnetic alignment" with the first row centre magnet member 141b, and the rotatable magnet 112 is in a proximal and perpendicular to the axis of rotation A2 "repelling-like-pole magnetic alignment" with the second row centre magnet member 141e; and in this instantaneous time the induced output voltage of the generator is going through the minimum induced generator output voltage duration. In addition during this time there is a proximal-distal angular, against the rotation axis A2, attractive-opposite-pole magnetic alignment between the second row's $1^{st}$ magnet member 141d and the rotating centre magnet 112; and there is a proximal-distal angular, against the rotation axis A2, attractive-opposite-pole magnetic alignment between the second row's 3rd magnet member 141f and the rotating centre magnet 112.

The resultant perpendicular vector summation of the proximal attractive magnetic forces acting between the first row centre magnet 141b and the second row centre magnet 141e on the rotating centre magnet and the accompanying magnetic field proximal density induces an AC current within the coil winding 104 and this combined with the angular vector summation of the proximal-distal attractive magnetic forces between the rotating magnet 112 and the second row's $1^{st}$ magnet 141d and the proximal-distal attractive magnetic forces between the rotating magnet 112 and the second row's $3^{rd}$ magnet 141f. causes a reduction in the overall rotational torque acting on the rotatable magnet 112 and the advantage of this overall action of angular force vectors that are affected by Ampere's Law describing the effects of eddy currents within the coil and also the rotating magnet and creating a opposing field vector [$\nabla \times H = J$ . . . H=magnetizing field, J=current density] that is the counter emf of Lenz's law shown by the negative sign in Faraday's law of induction, and the Lorentz Forces [$F = qvB \cdot \sin \Theta$] on moving charges results in a longer time duration for the damped sine wave when an electrical load is applied to the coil producing voltage.

Figure 15:
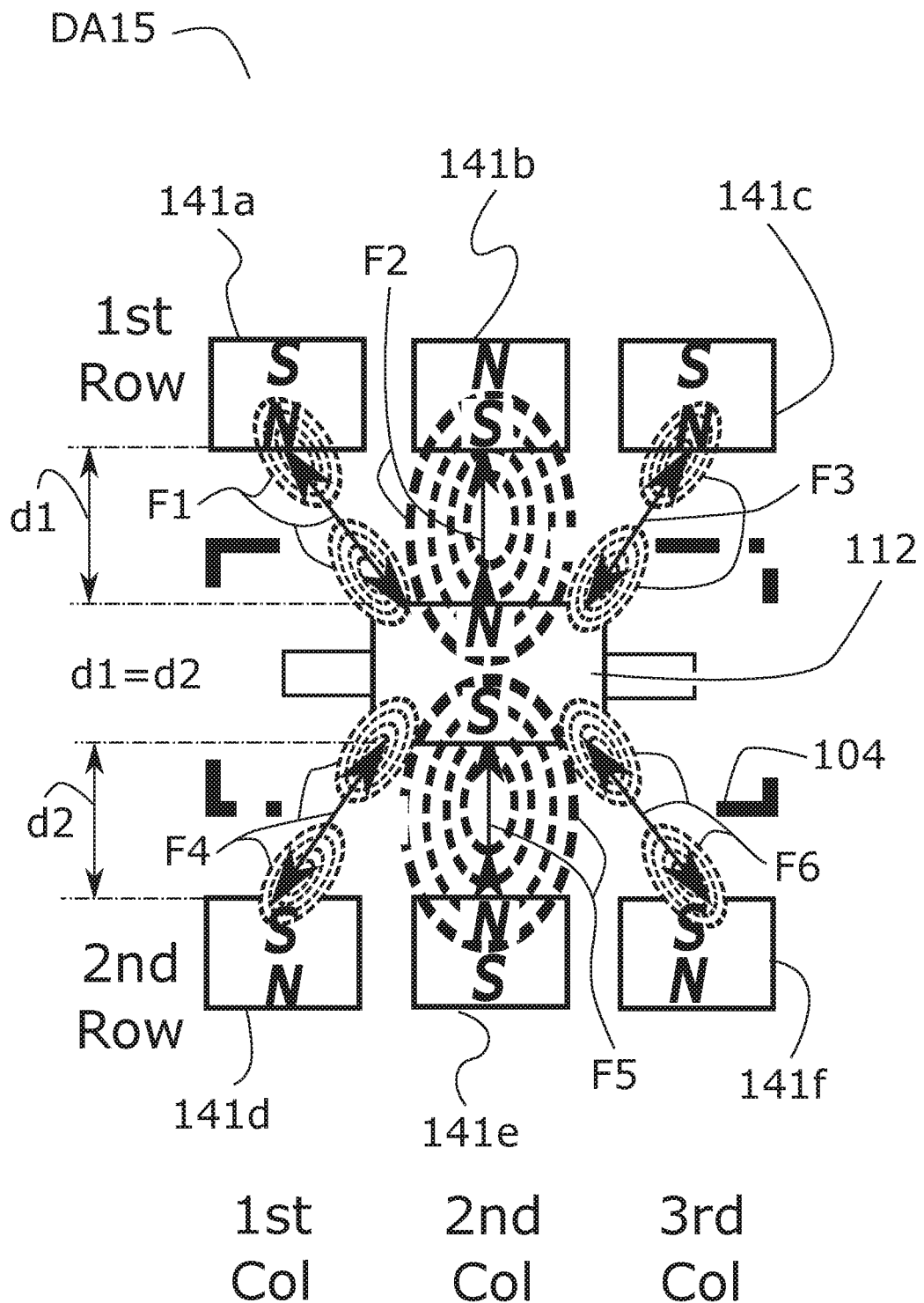
FIG. 15 is a block diagram drawing of the resultant associated magnetic flux of the embodiment of FIG. 14, during a centre group of the rotatable centre magnet and the top and bottom centred fixed disk magnets are in an attractive magnetic opposite-pole alignment.

FIG. 15 is a block diagram DA15 of the "Magnet Array," which is a novel matrix of magnets in a two row three column, with a centred rotatable magnet and showing the resultant vectors F1, F2, F3, F4, F5, & F6 for the magnetic flux lines of force in the present invention with the centre rotatable magnet 112 magnetically interacting with the resultant magnetic flux.

The following are the key differences between the magnetic field and magnetic flux.

The area around the magnetic field where the poles and the moving charge experience the force of attraction and repulsion is called a magnetic field. Whereas, the magnetic flux shows the quantities of the magnetic lines of force passes through ft.

The magnetic field is expressed as the product of the magnetic strength and the direction of the moving charges. F=qvB Whereas, the magnetic flux is the product of the field strength and the area around the poles. $\Phi$=BA

[3] The SI unit of the magnetic field is the Tesla whereas the SI unit of magnetic flux is the Weber.

[4] The magnetic field only depends on the magnet which generates it whereas the magnetic flux depends on the magnetic strength and area.

In FIG. 15 during an opposite-pole transitional period DA15 where the centre rotating magnet 112 that is poled through its width and has its rectangular width area in a plane substantially parallel to the horizontal plane, and where the first row's $2^{nd}$ member magnet's 141b axially poled characteristic is attractive to the centre rotating magnet 112; and the sectional resultant dynamic force vector F2 between them are magnetically attractive; and also during this opposite pole transitional period DA15 where the centre rotating magnet 112 that is poled through its width and has its rectangular width area in a plane substantially parallel to the horizontal plane; and where the second row's $2^{nd}$ member magnet's 141e axially poled characteristic is attractive to the centre rotating magnet 112, the existing sectional resultant dynamic force vector F5 between them are magnetically attractive.

In this same transitional period DA15 where the centre rotating magnet 112 that is poled through its width and has its rectangular width area in a plane substantially parallel to the horizontal plane; and where the first row's $1^{st}$ member magnet's 141a axially poled characteristic is transitionally repulsive to the centre rotating magnet 112; and the sectional resultant dynamic force vector F1 between them are magnetically repulsive; also during this sectional repelling like-pole transitional period where the centre rotating magnet 112 that is poled through its width and has its rectangular width area in a plane substantially parallel to the horizontal plane; and where the second row's $1^{st}$ member magnet's 141d axially poled characteristic is repulsive to the centre rotating magnet 112, the existing resultant substantially sectional dynamic force vector F5 between them are magnetically repulsive.

FIG. 15 also shows the magnetic flux field intensity between $1^{st}$ row centre magnet 141b and the magnetic flux field intensity of centre rotatable magnet 112 separated by proximal distance d1 and where the attractive force F2 varies to the inverse cube of the distance d1. Likewise the magnetic flux field intensity between 2nd row centre magnet 141e and the magnetic flux field intensity of centre rotatable magnet 112 separated by proximal distance d1 and where the attractive flux force F5 varies to the inverse cube of the distance d1.

There is a repulsive magnetic flux resultant F1 between $1^{st}$ row $1^{st}$ magnet member 141a and the centre rotatable magnet 112 and separated by distance of F1 that varies to the inverse cube of the cosine of d1; also there is a repulsive magnetic flux resultant F3 between $1^{st}$ row $3^{rd}$ magnet member 141c and the centre rotatable magnet 112 and separated by distance of F3 that varies to the inverse cube of the cosine of d1; and also there is a repulsive magnetic flux resultant between $2^{nd}$ row magnet 141d and the centre rotatable magnet 112 and separated by distance of F4 that varies to the inverse cube of the cosine of d2; plus there is a repulsive magnetic flux resultant between $2^{nd}$ row magnet 141f and the centre rotatable magnet 112 and separated by a distance of F6 that varies to the inverse cube of the cosine of d2.

Electric Effects

All of these flux fields are dynamic and changing with their effective intensity and polarity during a complete rotational cycle of operation caused by a triggering of the generator; and with that complete cycle action there are induced Foucault (eddy) currents that create counter electromotive forces (cemf; opposing voltages) that appear and change within the coil and also in the rotating magnet as well such that these repulsive flux force F1, F3, F4 & F6 producing currents create counter electromotive forces that cancels a portion of the Foucault currents induced in the coil and the rotatable magnet 112 that were initially created by the action of the rotatable magnet 112 rotating within the coil winding 104. The net effect is the reduce the counter torque on the rotating magnet 112 during operation and this results in the rotating magnet to experience more rotations with less torque drag and lengthens the duration time of the damped sinusoidal waveform and thus generating an increase in power over time.

Magnetic Effects

Now also in FIG. 15, consider only the resultant effects of the relative magnetic pole polarities changing during a complete operational cycle caused by triggering of the generator; as the rotatable magnet is forced into rotation by triggering, and during this transitional phase of rotation there are existing strong major inline pulling forces acting on the centre rotating magnet 112 from the magnetic attraction between the $1^{st}$ row centre magnet 141b and the rotating magnet 112, plus the existing strong major inline puffing force between the $2^{nd}$ row centre magnet 141e and the rotating centre magnet 112 that, isolated by itself in thought, will see a dragging mechanical impedance on the rotational torque of the rotating magnet 112; however, always simultaneously, there are the resultant moderate angular repulsive secondary pushing forces from the $1^{st}$ row's $1^{st}$ magnet member 141a and $3^{rd}$ magnet member 141c plus the $2^{nd}$ row's $1^{st}$ magnet member 141d and the $3^{rd}$ magnet member 141f all acting on the centre rotating magnet 112 that gives a resultant pushing force to lessen the amount of dragging mechanical impedance on the rotational torque of the rotating magnet 112, which in causes and increase in the number of rotating cycles before all frictional forces stop rotation.

Note 1: the resultant puffing forces are considered major (in strength) because of the proximal (shorter) distances d1 and d2 (d1=d2), and the resultant pushing forces are considered moderate (in strength) because of the proximal-distal distances (longer) F1, F3, F4 & F6 that all vary as the cosine of the distance d1=d2; and this results in the rotating magnet to experience more rotations with less torque drag and lengthens the duration time of the damped sinusoidal waveform and thus generating an increase in power over time.

Figure 16:
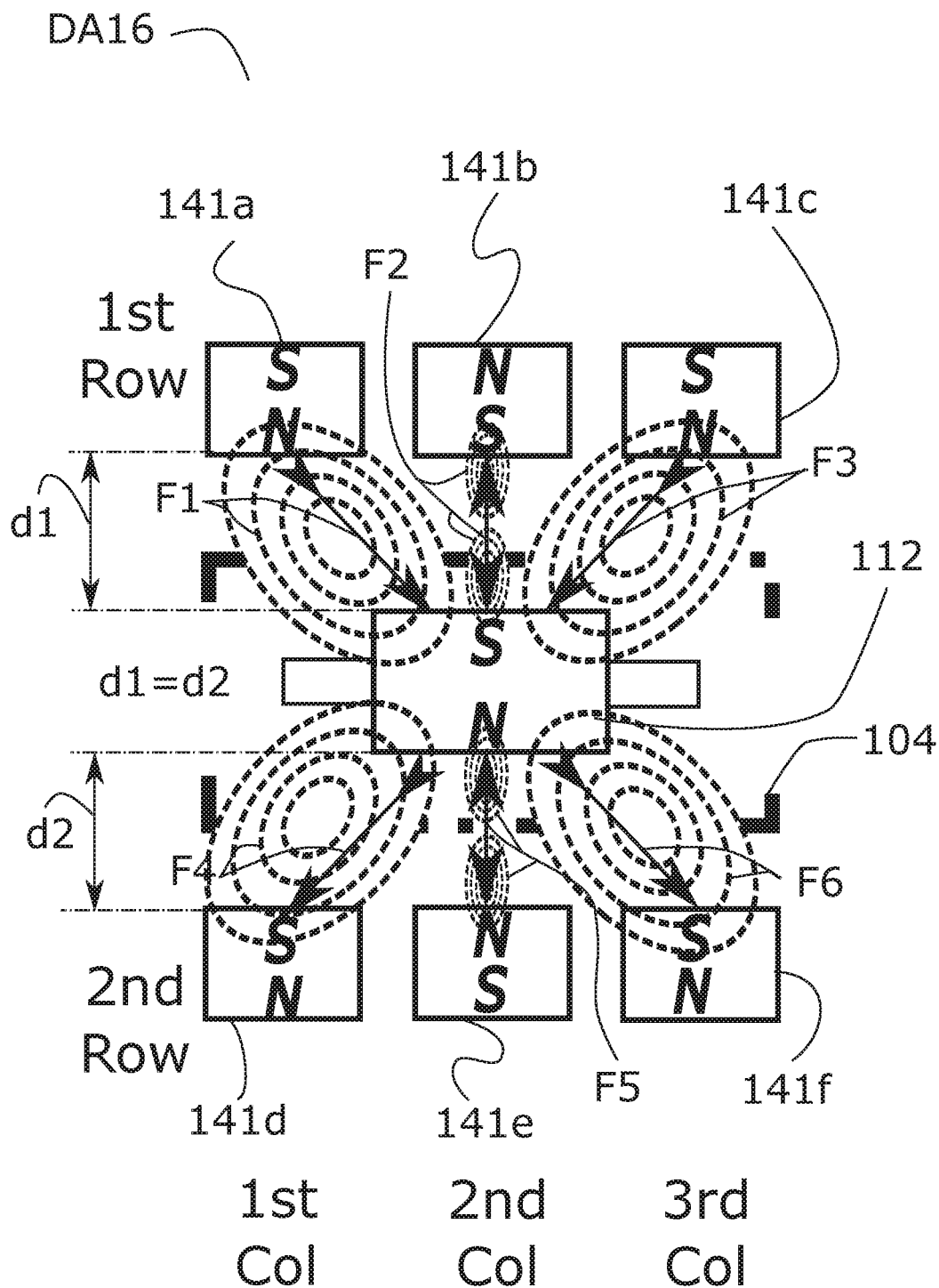
FIG. 16 is a block diagram drawing of the resultant associated magnetic flux of the embodiment of FIG. 14, during a centre group of the rotatable centre magnet and the top and bottom centred fixed disk magnets are in an repulsive magnetic like-pole alignment.

FIG. 16 is a block diagram DA16 of an embodiment of present invention having a novel matrix of magnets in a two row three column, with a centred rotatable magnet and showing the resultant vectors F1, F2, F3, F4, F5, & F6 for the magnetic flux lines of force in the present invention with the centre rotatable magnet 112 magnetically interacting with the resultant magnetic flux.

In FIG. 16 during a like-pole transitional period DA16 where the centre rotating magnet 112 that is poled through its width and has its rectangular width area in a plane substantially parallel to the horizontal plane, and where the first row's $2^{nd}$ member magnet's 141b axially poled characteristic is repulsive to the centre rotating magnet 112; and the sectional resultant dynamic force vector F2 between them are magnetically repelling; and also during this like-pole transitional period DA1S where the centre rotating magnet 112 that is poled through its width and has its rectangular width area in a plane substantially parallel to the horizontal plane; and where the second row's $2^{nd}$ member magnet's 141e axially poled characteristic is repulsive to the centre rotating magnet 112, the existing sectional resultant dynamic force vector F5 between them are magnetically repelling.

In this same transitional period DA16 where the centre rotating magnet 112 that is poled through its width and has its rectangular width area in a plane substantially parallel to the horizontal plane; and where the first row's $1^{st}$ member magnet's 141a axially poled characteristic is transitionally attractive to the centre rotating magnet 112; and the sectional resultant dynamic force vector F1 between them are magnetically attractive; also during this sectional repelling Ikepole transitional period where the centre rotating magnet 112 that is poled through its width and has its rectangular width area in a plane substantially parallel to the horizontal plane; and where the second row's $1^{st}$ member magnet's 141d axially poled characteristic is attractive to the centre rotating magnet 112, the existing resultant substantially sectional dynamic force vector F5 between them are magnetically repulsive.

FIG. 16 also shows the magnetic flux field intensity between $1^{st}$ row centre magnet 141b and the magnetic flux field intensity of centre rotatable magnet 112 separated by proximal distance d1 and where the repulsive force F2 varies to the inverse cube of the distance d1. Likewise the magnetic flux field intensity between 2nd row centre magnet 141e and the magnetic flux field intensity of centre rotatable magnet 112 separated by proximal distance d1 and where the repulsive flux force F5 varies to the inverse cube of the distance d1.

There is an attractive magnetic flux resultant F1 between $1^{st}$ row $1^{st}$ magnet member 141a and the centre rotatable magnet 112 and separated by distance of F1 that varies to the inverse cube of the cosine of d1; also there is an attractive magnetic flux resultant F3 between $1^{st}$ row $3^{rd}$ magnet member 141c and the centre rotatable magnet 112 and separated by distance of F3 that varies to the inverse cube of the cosine of d1; and also there is an attractive magnetic flux resultant between $2^{nd}$ row magnet 141d and the centre rotatable magnet 112 and separated by distance of F4 that varies to the inverse cube of the cosine of d2; plus there is an attractive magnetic flux resultant between 2"d row magnet 141f and the centre rotatable magnet 112 and separated by a distance of F6 that varies to the inverse cube of the cosine of d2.

Electric Effects

All of these flux fields are dynamic and changing with their effective intensity and polarity during a complete rotational cycle of operation caused by a triggering of the generator; and with that complete cycle action there are induced Foucault (eddy) currents that create counter electromotive forces (cemf; opposing voltages) that appear and change within the coil and also in the rotating magnet as well such that these repulsive flux force F1, F3, F4 & F6 producing currents create counter electromotive forces that cancels a portion of the Foucalt currents induced in the coil and the rotatable magnet 112 that were initially created by the action of the rotatable magnet 112 rotating within ins the coil winding 104. The net effect is the reduce the counter torque on the rotating magnet 112 during operation and this results in the rotating magnet to experience more rotations with less torque drag and lengthens the duration time of the damped sinusoidal waveform and thus generating an increase in power over time.

Magnetic Effects

Now also in FIG. 16, consider only the resultant effects of the relative magnetic pole polarities changing during a complete operational cycle caused by triggering of the generator; as the rotatable magnet is forced into rotation by triggering, and during this transitional phase of rotation there are existing moderate inline pushing forces acting on the centre rotating magnet 112 from the magnetic repulsion between the $1^{st}$ row centre magnet 141*b* and the rotating magnet 112, plus the existing substantially strong inline pushing force between the $2^{nd}$ row centre magnet 141*e* and the rotating centre magnet 112 that, isolated by itself in thought, will see a minimization of the mechanical impedance on the rotational torque of the rotating magnet 112; however, always simultaneously, there are the resultant major angular attractive secondary pulling forces from the $1^{st}$ row's $1^{st}$ magnet member 141*a* and $3^{rd}$ magnet member 141*c* plus the $2^{nd}$ row's $1^{st}$ magnet member 141*d* and the $3^{rd}$ magnet member 141*f* all acting on the centre rotating magnet 112 that gives a resultant pulling force to increase the amount of dragging mechanical impedance on the rotational torque of the rotating magnet 112, however, the resultant effect of the inline pushing forces of the $1^{st}$ row's centre magnet 141*b* and also $2^{nd}$ row's centre magnet 141*e* on centre rotating magnet 112 and both the $1^{st}$ row's $1^{st}$ 141*a* and $3^{rd}$ 141*c* member magnets along with the $2^{nd}$ row's $1^{st}$ 141*d* and $3^{rd}$ 141*f* member magnets, which in causes and increase in the number of rotating cycles before all frictional forces stop rotation.

Note 2: the resultant pulling forces are considered here moderate (in strength) because of the proximal-distal (longer) distances F1, F3, F4 & F6 that all vary as the cosine of the distance d1=d2, and the resultant pushing forces are considered strong (in strength) because of the proximal distances (shorter) F2 & F5 that all vary as of the distance d1=d2; and this results in the rotating magnet to experience more rotations with less torque drag and lengthens the duration time of the damped sinusoidal waveform and thus generating an increase in power over time.

The present invention includes additional magnets in each row disposed according to the teaching of the present invention, and lesser or greater number of trigger receiver tabs and corresponding finger tabs with corresponding modifications to related or surrounding structures to accommodate such additional magnets or tabs. Further modifications and/or substitutions by one of ordinary skill in the art according to the present invention is considered to be part of the present invention,

What is claimed is:

1. An electrical generator, comprising:
    a movable magnet having opposing N and S poles disposed along a first axis to rotate about a second axis perpendicular to said first axis, between said N and said S pole;
    a first row of a plurality of magnets each having a N and a S pole disposed on an axis oriented to be perpendicular to said movable magnet second axis, wherein
    each of said first row of magnets axes are substantially parallel, and
    said N and S poles of adjacent magnets are oppositely disposed within said first row; and
    a coil of wire having a center opening disposed to receive said movable magnet, and an outer region of wire disposed proximal to said first row of a plurality of magnets poles facing said movable magnet,
    wherein rotation of said movable magnet relative to said first row of a plurality of magnets causes a flow of current through said coil of wire.

2. The electrical generator of claim 1, further comprising a second row of a plurality of magnets each having a N and a S pole disposed on an axis oriented to be perpendicular to said movable magnet second axis, wherein
    each of said second row of magnets axes are substantially parallel, and
    said N and S poles of adjacent magnets are oppositely disposed.

3. The electrical generator of claim 1, wherein said axis of a magnet of said second row of said plurality of magnets is aligned to coincide with said axis of a magnet of said first row of said plurality of magnets.

4. The electrical generator of claim 3, wherein said axis of each of said second row of said plurality of magnets is aligned to coincide with a corresponding said axis of a facing magnet of said first row of said plurality of magnets.

5. The electrical generator of claim 3, wherein said facing magnets of said first row and second row magnets have opposite magnetic poles.

6. The electrical generator of claim 1, wherein said movable magnet has a length parallel to said movable magnet second axis, and said first row of a plurality of magnets is disposed along a length greater than said movable magnet length.

7. The electrical generator of claim 1, further including a first tab extending radially outward from said movable magnet second axis, and attached to said movable magnet, and a finger extending toward said movable magnet second axis and movable to tangentially engage said first tab causing rotation of said movable magnet about said second axis.

8. The electrical generator of claim 7, further including a second tab angularly separated from said first tab, disposed to engage said finger.

9. The electrical generator of claim 8, wherein second tab is attached to said first tab and is angularly and obliquely separated from said first tab at an end, and disposed to tangentially engage said finger.

10. An electrical generator comprising:
    a horizontal elongated length-dimension slab base substrate comprised with a substantially central perpendicular blind hollowed chamber with disposed opposite elongated width ends extending through portals, each portal disposed substantially midway from base substrate bottom,
    and distal on one side from said chamber is disposed a perpendicular width-orientated first compartment member where disposed are a plurality of inline vertical blind holes, with each said vertical blind hole member equidistant from each other;
    and each said vertical blind hole of said first compartment member has disposed and is retained a magnet,
    and distal on a side opposite from said chamber is disposed a perpendicular width-orientated second compartment member where disposed are a plurality of inline vertical blind holes, with each said vertical blind hole member equidistant from each other,
    and each said vertical blind hole of said second compartment member has disposed and is retained a magnet, and at an end proximal from said width-orientated second perpendicular compartment member is disposed a vertical slab on opposite width ends of said substrate;

and on each opposite width end vertical slab is a right angled substantially horizontal eccentric axle protrusion with a length extending from said vertical slab protrusion inside surface;

a bifurcated cantilever member comprising two extending and separated arms each having on one end a bifurcated snap-on open slotted hole set;

and each said bifurcated cantilever member arm is disposed and rotatable on and about one of said right angled substantially horizontal eccentric axle protrusion bifurcated member set;

a bifurcated axle elongated chamber disposed with a center blind elongated hole that is disposed within said perpendicular blind hollowed chamber with disposed opposite width end elongated through portals;

and said bifurcated axle elongated chamber disposed with a center blind elongated hole has disposed and retained within an elongated rare earth magnet magnetically poled through its width axis and includes thereon a radially extending tab to move together with said bifurcated axle elongated chamber on each elongated width end having one of said bifurcated axle arms extending therefrom and each tab being engaged by a corresponding arm of said bifurcated cantilever member to cause radial rotation thereof along said width axis;

and said elongated width ends comprise bifurcated axle members disposed within said through portals and rendered free to rotate bi-directionally through 360 degrees of rotation;

and said bifurcated axle elongated chamber disposed with a center blind elongated hole disposed within said perpendicular blind hollowed chamber by a disposed and retained bottom bifurcated axle elongated chamber support platform with bifurcated axle support members;

a center through holed coil bobbin with a substantially wound wire winding that is disposed and retained on said substantially central perpendicular blind hollowed chamber with disposed opposite width end elongated through portals;

and an elongated generator enclosure disposed with a movable push-button platform utilised for urging said bifurcated cantilever to rotate about its bifurcated snap-on open slotted hole set to trigger said generator wherein each said magnet contained in a corresponding said vertical blind hole, has a N and a S pole disposed on an axis oriented to be perpendicular to said elongated rare earth magnet width axis, and comprise at least one row of magnets axes which are substantially parallel, and said N and S poles of adjacent magnets are oppositely disposed within said first row.

* * * * *

UNITED STATES PATENT AND TRADEMARK OFFICE
CERTIFICATE OF CORRECTION

PATENT NO. : 11,368,079 B2  
APPLICATION NO. : 16/675401  
DATED : June 21, 2022  
INVENTOR(S) : David Deak, Sr.

Page 1 of 1

It is certified that error appears in the above-identified patent and that said Letters Patent is hereby corrected as shown below:

On the Title Page

Column 1, item (60) Related U.S. Application Data, Add:
(60) Provisional Application No. 62/876,621 filed on July 20, 2019

Signed and Sealed this  
Thirteenth Day of September, 2022

Katherine Kelly Vidal  
*Director of the United States Patent and Trademark Office*